(12) United States Patent
Ikushima

(10) Patent No.: US 9,539,596 B2
(45) Date of Patent: Jan. 10, 2017

(54) LIQUID DISPENSING APPARATUS, COATING APPARATUS FOR SAME, AND LIQUID DISPENSING METHOD

(71) Applicant: MUSASHI ENGINEERING, INC., Mitaka-shi, Tokyo (JP)

(72) Inventor: Kazumasa Ikushima, Mitaka (JP)

(73) Assignee: MUSASHI ENGINEERING, INC., Tokyo (JP)

( * ) Notice: Subject to any disclaimer, the term of this patent is extended or adjusted under 35 U.S.C. 154(b) by 0 days.

(21) Appl. No.: 14/383,366

(22) PCT Filed: Mar. 7, 2013

(86) PCT No.: PCT/JP2013/056263
§ 371 (c)(1),
(2) Date: Sep. 5, 2014

(87) PCT Pub. No.: WO2013/133365
PCT Pub. Date: Sep. 12, 2013

(65) Prior Publication Data
US 2015/0246368 A1   Sep. 3, 2015

(30) Foreign Application Priority Data

Mar. 8, 2012   (JP) ................................ 2012-051281

(51) Int. Cl.
*B05B 3/00*   (2006.01)
*F04B 39/00*   (2006.01)
(Continued)

(52) U.S. Cl.
CPC ............... *B05B 9/0409* (2013.01); *B05B 3/18* (2013.01); *B05C 5/0212* (2013.01);
(Continued)

(58) Field of Classification Search
USPC   118/300, 323, 305, 679–682, 321; 222/319; 134/102.2; 417/512, 531, 538
See application file for complete search history.

(56) References Cited

U.S. PATENT DOCUMENTS 5,127,547 A   7/1992   Gerich
5,277,338 A   1/1994   Divall
(Continued)

FOREIGN PATENT DOCUMENTS

EP   0443276 A1   8/1991
JP   48-034007 A   5/1973
(Continued)

OTHER PUBLICATIONS

International Search Report dated Jun. 11, 2013, issued in corresponding application No. PCT/JP2013/056263.
(Continued)

*Primary Examiner* — Yewebdar Tadesse
(74) *Attorney, Agent, or Firm* — Westerman, Hattori, Daniels & Adrian, LLP

(57) ABSTRACT

A liquid dispensing apparatus (1) includes a liquid contact member (2) that has measuring bores (11, 11). A first piston (3) slides in the first measuring bore (11) and a second piston (3) sliding in the second measuring bore (11). A supply channel (5) communicates with a storage unit (17). An ejection channel (6) communicates with a nozzle (18). A switching valve (4) is disposed in a space in the liquid contact member (2), and that has a first position and a second position. A valve driving mechanism (8) operates the switching valve (4). A piston driving mechanism (9) operates an arm (19) connected to the first and second pistons. The first and second measuring bores are arranged to oppose to each
(Continued)

other on both sides of the switching valve (4), and the supply channel (5) and the ejection channel (6) are arranged adjacent to the switching valve.

19 Claims, 17 Drawing Sheets

(51) Int. Cl.
*B65D 83/00* (2006.01)
*B05B 9/04* (2006.01)
*B05C 11/10* (2006.01)
*G01F 11/02* (2006.01)
*B05B 3/18* (2006.01)
*F04B 9/10* (2006.01)
*F04B 7/00* (2006.01)
*F04B 13/02* (2006.01)
*F04B 35/04* (2006.01)
*B05C 5/02* (2006.01)

(52) U.S. Cl.
CPC ...... *B05C 11/1002* (2013.01); *B05C 11/1047* (2013.01); *B65D 83/0022* (2013.01); *F04B 7/0023* (2013.01); *F04B 9/10* (2013.01); *F04B 13/02* (2013.01); *F04B 35/04* (2013.01); *G01F 11/021* (2013.01); *G01F 11/029* (2013.01); *B05C 5/0225* (2013.01); *B05C 5/0229* (2013.01)

(56) References Cited

U.S. PATENT DOCUMENTS

| | | | |
|---|---|---|---|
| 5,445,180 A | 8/1995 | Divall | |
| 2003/0194481 A1* | 10/2003 | Lippelt | B05B 12/08 427/8 |
| 2008/0294040 A1* | 11/2008 | Mohiuddin | A61M 5/14216 600/432 |

FOREIGN PATENT DOCUMENTS

| | | |
|---|---|---|
| JP | 48-034007 Y | 10/1973 |
| JP | 60-094172 A | 5/1985 |
| JP | 62-087782 U | 6/1987 |
| JP | 4-339796 A | 11/1992 |
| JP | 2004-084592 A | 3/2004 |
| JP | 2008-229421 A | 10/2008 |
| JP | 2009172571 A | 8/2009 |
| JP | 2010-104965 A | 5/2010 |
| JP | 2011-067756 A | 4/2011 |

OTHER PUBLICATIONS

Supplementary European Search Report dated Feb. 11, 2016, issued in European Application No. 13758360.5 (2 pages).
Office Action dated Mar. 8, 2016, issued in counterpart Japanese Application No. 2012-051281 (5 pages).
Search Report dated Aug. 11, 2016, issued in counterpart Chinese Patent Application No. 201380013298.3, with English translation. (4 pages).
Office Action dated Aug. 19, 2016, issued in counterpart Chinese Patent Application No. 201380013298.3, with English translation. (7 pages).

* cited by examiner (a)

A-A (b)

LIQUID DISPENSING APPARATUS, COATING APPARATUS FOR SAME, AND LIQUID DISPENSING METHOD

TECHNICAL FIELD

The present invention relates to a liquid dispensing apparatus that sucks a liquid into a measuring bore with driving of a piston, and that discharges the liquid having been sucked into the measuring bore with the driving of the piston. The present invention further relates to a coating apparatus using the liquid dispensing apparatus, and to a liquid dispensing method.

BACKGROUND ART

As an apparatus for discharging or dispensing a liquid in a constant amount, there is known an apparatus that sucks the liquid into a measuring bore (cylinder) with driving of a piston, and that discharges the liquid having been sucked into the measuring bore with the driving of the piston. Regarding that type of apparatus, there have been proposed so far various apparatuses each including a plurality of pistons and a plurality of measuring bores. The apparatus including the plural pistons and the plural measuring bores is designed such that a time wastefully taken to suck and discharge the liquid in successive steps is reduced by alternately sucking and discharging the liquid. As examples of the apparatuses each including the plural pistons and the plural measuring bores, there are apparatuses in each of which one multi-way value is used to switch over channels connected to the plural measuring bores, a liquid supply port, and a liquid discharge port. Those apparatuses are mainly grouped, depending on the piston type, into an apparatus in which a liquid is sucked and discharged at one side of the piston as disclosed in Patent Document 1, and an apparatus in which a liquid is sucked and discharged at both sides of the piston as disclosed in Patent Document 2.

A method disclosed in Patent Document 1 is as follows. A paint cylinder is disposed in a paint pressure-feed line through which a highly-viscous paint is fed under pressure, and a hydraulic cylinder is disposed in such a state that respective piston rod heads of the paint cylinder and the hydraulic cylinder are coupled to each other. The highly-viscous paint fed under pressure from a paint pressure-feed pump is supplied to the paint cylinder and is temporarily stored therein. Hydraulic operating oil is then injected into the hydraulic cylinder to extend a piston rod of the hydraulic cylinder, thereby contracting a piston rod of the paint cylinder. As a result, the highly-viscous paint stored in the paint cylinder is supplied to an airless painting apparatus through the paint pressure-feed line.

An apparatus disclosed in Patent Document 2 is as follows. A pair of plunger pumps having the same diameter are coaxially arrayed such that respective open ends of their cylindrical bores are opposed to each other. Plungers are integrally coupled to each other in a state where a spacing distance between both cylinders is adjustable. By alternately repeating an operation of supplying a pressurized liquid to an outlet tube of one pump and an operation of opening an outlet tube of the other pump to ambient air, the integrally-coupled plungers are caused to reciprocally slide in both the cylindrical bores due to a difference between pressures of liquids being present in both the cylindrical bores and acting on the plungers. As a result, a constant amount of the liquid is alternately discharged through the outlet tube that is opened to the ambient air. By adjusting sliding strokes of the plungers depending on the spacing distance between both the cylinders, the amount of the liquid alternately discharged from the output tubes of both the pumps can be set to a desired value.

Meanwhile, the applicant has proposed, in Patent Document 3, a bubble mixing prevention mechanism for use in a discharge apparatus comprising a measuring portion that has a channel communicating with a nozzle, and a plunger that is reciprocally moved in the channel of the measuring portion, the bubble mixing prevention mechanism being mountable to an end of the measuring portion at the side opposite to the nozzle, wherein the bubble mixing prevention mechanism includes a first bore that is communicated with the channel of the measuring portion and that allows the plunger to reciprocally move therein, a first sealing member that is disposed at an end of the first bore at the side closer to the nozzle, a second sealing member that is disposed at an end of the first bore at the side opposite to the nozzle, and a second bore that is communicated with a lateral surface of the first bore.

LIST OF PRIOR-ART DOCUMENTS

Patent Documents

Patent Document 1: Japanese Patent Laid-Open Publication No. S60-94172
Patent Document 2: Japanese Utility Model Registration Publication No. S48-34007
Patent Document 3: Japanese Patent Laid-Open Publication No. 2011-67756

SUMMARY OF THE INVENTION

Problems to be Solved by the Invention

Because of including many tubing lines (channels) connected to the measuring bore (cylinder) and the switching valve, the liquid dispensing apparatuses of the prior art have the problem that it is troublesome to perform disassembling, cleaning, and assembling operations which are required on the occasion of maintenance or replacement of the liquid type.

In the configuration in which the measuring bore and the switching valve are installed apart from each other, a liquid (not-discharged liquid) acting as a pressure transmission medium has to be filled in tubing lines, which connect the measuring bore and the switching valve. This gives rise to the problem that the not-discharged liquid is wastefully discarded on the occasion of maintenance or replacement of the liquid type.

Furthermore, when the tubing lines are long, another problem arises in that a pressure loss is increased between an inlet and an outlet of each line, and responsibility to the action of the piston is reduced.

The liquid dispensing apparatus including two pistons has the problem that it is difficult to keep uniform amounts of discharged liquids between the plural pistons. When a driving mechanism is provided for each of the plural pistons, another problem arises in that the volume and the weight of the liquid dispensing apparatus are so increased as to cause a difficulty in mounting the liquid dispensing apparatus on a desktop type coating apparatus.

In view of those situations in the art, an object of the present invention is to provide a liquid dispensing apparatus, a coating apparatus using the liquid dispensing apparatus, and a liquid dispensing method, which can solve the above-mentioned problems.

Means for Solving the Problems

According to a first invention, there is provided a liquid dispensing apparatus that sucks a liquid into a measuring bore and ejects the liquid in the measuring bore by moving a piston reciprocally, the liquid dispensing apparatus comprising a liquid contact member that has first and second measuring bores, a first piston sliding in the first measuring bore in close contact therewith and a second piston sliding in the second measuring bore in close contact therewith, a supply channel communicating with a storage unit, an ejection channel communicating with a nozzle, a switching valve that is disposed in a space in the liquid contact member, and that has a first position at which the first measuring bore is communicated with the supply channel and the second measuring bore is communicated with the ejection channel, and a second position at which the first measuring bore is communicated with the ejection channel and the second measuring bore is communicated with the supply channel, a valve driving mechanism that operates the switching valve, and a piston driving mechanism that operates an arm connected to the first and second pistons, wherein the first and second measuring bores are arranged to oppose to each other on both sides of the switching valve, and the supply channel and the ejection channel are arranged adjacent to the switching valve.

According to a second invention, in the first invention, the arm holds constant a distance between the first and second pistons.

According to a third invention, in the first or second invention, the liquid contact member including the switching valve disposed in an inner space thereof is detachably attached to the liquid dispensing apparatus.

According to a fourth invention, in the first, second or third invention, the liquid contact member is constituted as a single member.

According to a fifth invention, in any one of the first to fourth inventions, the switching valve includes a valve element that has two channels therein.

According to a sixth invention, in any one of the first to fifth inventions, the valve driving mechanism and the piston driving mechanism are disposed at rear side of the liquid contact member adjacent to each other in a vertical direction.

According to a seventh invention, in any one of the first to sixth inventions, the valve driving mechanism is disposed above the piston driving mechanism and includes a power transmission member through which motive power is transmitted to the switching valve.

According to an eighth invention, in any one of the first to seventh inventions, the piston driving mechanism is disposed above the valve driving mechanism, and the valve driving mechanism and the switching valve are directly coupled to each other.

According to a ninth invention, in any one of the first to seventh inventions, the valve driving mechanism includes a connecting portion that has a concave or convex part formed at an end thereof, and a convex or concave part engageable with the concave or convex part of the connecting portion is provided at an end of the switching valve.

According to a tenth invention, in any one of the first to ninth inventions, the liquid dispensing apparatus further comprises a connecting member for supply, which has the supply channel therein and which is detachably attached to the liquid contact member, and a connecting member for ejection, which has the ejection channel therein and which is detachably attached to the liquid contact member.

According to an eleventh invention, in any one of the first to tenth inventions, the liquid contact member includes a first bubble mixing prevention mechanism including a first bore that is communicated with the first measuring bore and that allows the piston to move reciprocally in the first bore, and a second bore that is communicated with the first bore at a lateral surface thereof, and a second bubble mixing prevention mechanism including a first bore that is communicated with the second measuring bore and that allows the piston to move reciprocally in the first bore, and a second bore that is communicated with the first bore at a lateral surface thereof.

According to a twelfth invention, there is provided a coating apparatus comprising the liquid dispensing apparatus according to any one of the first to eleventh inventions, a compressed gas source that supplies compressed gas to apply pressure to a liquid that is stored in a storage vessel, a discharge controller that controls driving mechanisms of the liquid dispensing apparatus and gas pressure in the compressed gas source, a work table on which a coating target is placed, XYZ driving mechanisms that move the liquid dispensing apparatus and the work table relative to each other, and a driving controller that controls operations of the XYZ driving mechanisms.

According to a thirteenth invention, in the twelfth invention, the coating apparatus is of desktop type.

According to a fourteenth invention, there is provided a liquid dispensing method of sucking a liquid into a measuring bore and ejecting the liquid in the measuring bore by moving a piston reciprocally in a liquid dispensing apparatus comprising a liquid contact member that has first and second measuring bores, a first piston sliding in the first measuring bore in close contact therewith and a second piston sliding in the second measuring bore in close contact therewith, a supply channel communicating with a storage unit, an ejection channel communicating with a nozzle, a switching valve that is disposed in a space in the liquid contact member, and that has a first position at which the first measuring bore is communicated with the supply channel and the second measuring bore is communicated with the ejection channel, and a second position at which the first measuring bore is communicated with the ejection channel and the second measuring bore is communicated with the supply channel, a valve driving mechanism that operates the switching valve, and a piston driving mechanism that operates an arm connected to the first and second pistons, the first and second measuring bores being arranged to oppose to each other on both sides of the switching valve, and the supply channel and the ejection channel being arranged adjacent to the switching valve, wherein the liquid dispensing method comprises a first step of sucking the liquid into the first measuring bore and ejecting the liquid from the second measuring bore by operating the switching valve to the first position and moving the arm in one direction, a second step of ejecting the liquid from the first measuring bore and sucking the liquid into the second measuring bore by operating the switching valve to the second position and moving the arm in a direction opposite to the moving direction in the first step, and a third step of successively discharging the liquid in units of a constant amount by repeating the first and second steps.

Advantageous Effects of the Invention

The following advantageous effects can be obtained with the present invention:

(1) Time and labor taken to perform the disassembling, cleaning, and assembling operations can be reduced.
(2) The usage of the liquid, particularly, the usage of the not-discharged liquid, such as the pressure transmission medium, can be reduced significantly.
(3) The pressure loss can be reduced, and the responsibility can be increased.
(4) The liquid contact member can be easily attached to and detached from the liquid dispensing apparatus.
(5) Each piston can be finely controlled in positioning thereof, and a difference in amount of the discharged liquid between the two pistons and between the two measuring bores can be substantially eliminated.
(6) A small-sized liquid dispensing apparatus including two pistons can be provided which can be mounted to a desktop type coating apparatus.

BRIEF DESCRIPTION OF THE DRAWINGS

FIG. 14(a) is a plan sectional view, and FIG. 14(b) is a sectional view taken along A-A in FIG. 14(a).

MODE FOR CARRYING OUT THE INVENTION

Examples of mode for carrying out the present invention will be described below.

First Embodiment

Figure 1:
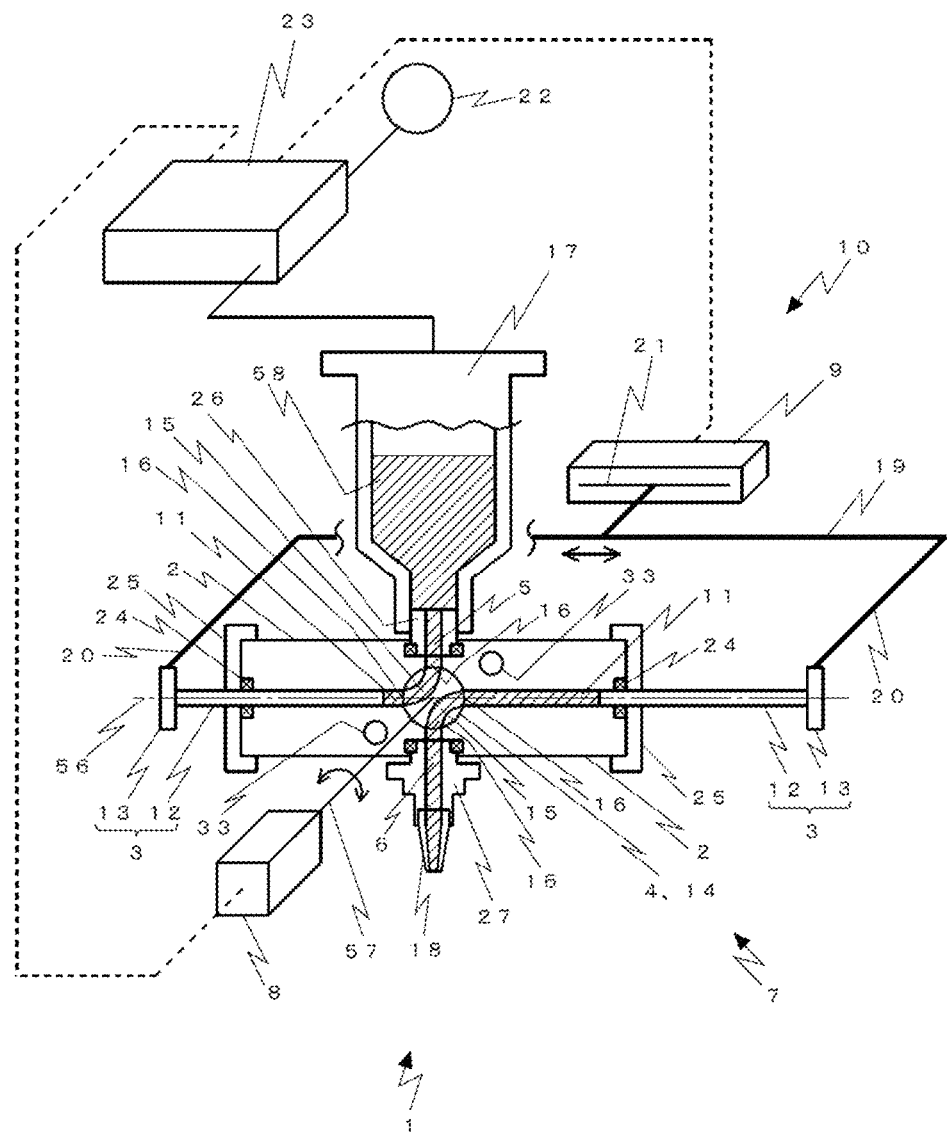
FIG. 1 is a schematic view of a liquid dispensing apparatus according to a first embodiment of the present invention.

FIG. 1 is a schematic view of a liquid dispensing apparatus according to a first embodiment. A liquid dispensing apparatus 1 according to the first embodiment mainly includes a liquid contact unit 7 and a driving unit 10. The driving unit 10 is constituted by a valve driving mechanism 8 and a piston driving mechanism 9.

Figure 2:
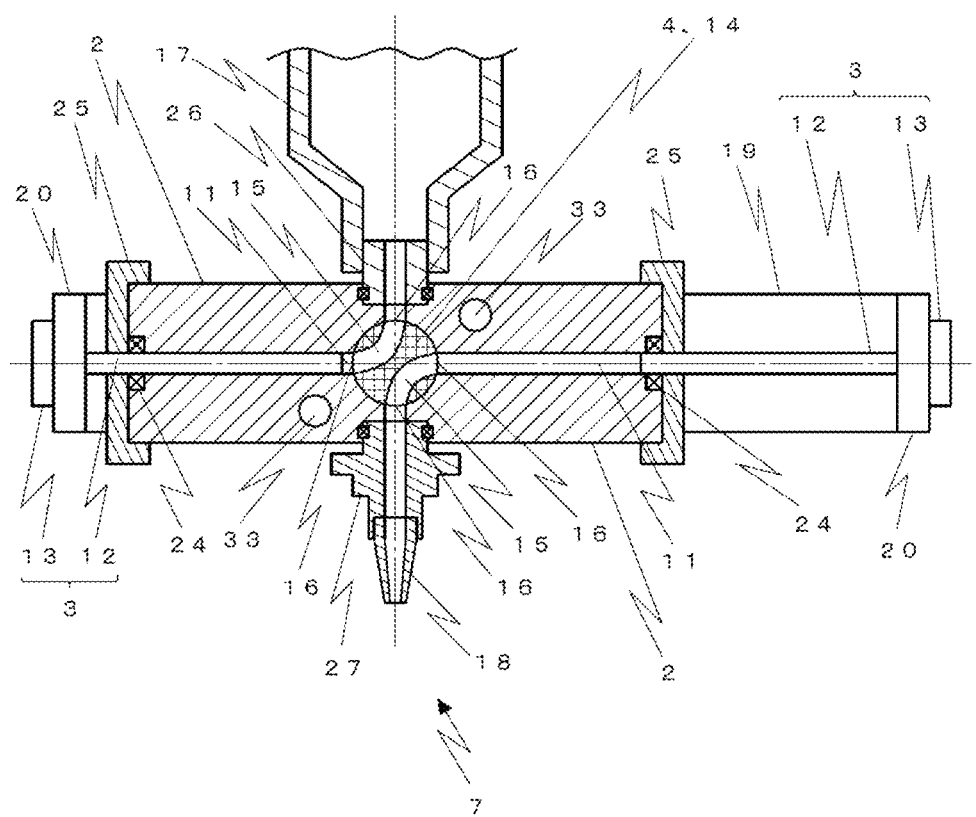
FIG. 2 is a front view, partly sectioned in principal parts, of a liquid contact unit in the first embodiment of the present invention.

FIG. 2 is a front view, partly sectioned in principal parts, of the liquid contact unit in the first embodiment.

[Liquid Contact Unit 7]

A liquid contact member 2 is a cylindrical member having a thick wall. Inside the liquid contact member 2, there are formed two measuring bores 11 that are each a circular columnar space, and a center space in which a valve element 14 is disposed. A connecting member 26 (including a supply channel 5) for connection to a storage vessel 17 and a connecting member 27 (including an ejection channel 6) for connection to a nozzle 18 are disposed on the liquid contact member 2 at upper and lower positions opposing to each other with the valve element 14 interposed between both the connecting members. With replacement of the connecting members (26 and 27), easy adaptation is ensured even for the case where the types of the storage vessel 17 and a nozzle 18 are changed and shapes of connectors are changed. It is to be here noted that the connecting members (26, 27) are just required to be arranged adjacent to the valve element 14, and they are not always required to be arranged at upper and lower positions opposing to each other with the valve element 14 interposed between both the connecting members.

In this embodiment, to alternately operate a plurality (two in this embodiment) of pistons 3 by one piston driving mechanism 9, component layout is designed such that respective center axes of the two pistons 3 lie on one linear line. A sealing member 24 serving to prevent leakage of a liquid is disposed at an open end of each measuring bore 11 into which the piston 3 is inserted, and a retaining member 25 serving to prevent slipping-off of the sealing member 24 is disposed at each of both ends of the liquid contact member 2. The retaining member 25 is constituted to be easily detachable for easy replacement of the sealing member 24.

The pistons 3 are each made up of a smaller-diameter portion 12 and a larger-diameter portion 13. A part of the smaller-diameter portion 12 is inserted in the measuring bore 11, and the larger-diameter portion 13 serves as a stopper and a thumb when the piston 3 is attached to an arm 19 described later. The piston 3 is reciprocally moved in close sliding contact with an inner wall of the measuring bore 11, thus sucking the liquid into the measuring bore 11 and pushing out the liquid from the measuring bore 11. A predetermined region of the smaller-diameter portion 12 at the side close to the larger-diameter portion 13 is threaded, and the piston 3 is fixed by screwing the predetermined threaded region of the smaller-diameter portion 12 into a hole that is formed in a fore end of the arm 19. The predetermined threaded region is preferably set to a size ranging, for example, from substantially the same value as the thickness of the arm 19 to twice.

The switching valve 4 switches over the communication between the measuring bore 11 and the supply channel 5 and the communication between the measuring bore 11 and the ejection channel 6. The switching valve 4 includes the valve element 14 having two inner channels 15. With the valve element 14 selectively taking a first position and a second position, channels to establish the communication between the measuring bore 11 and the supply channel 5 and the communication between the measuring bore 11 and the ejection channel 6 are switched over. In this embodiment, the valve element 14 has a circular columnar shape and includes four ports 16, which are formed in an outer circumferential surface thereof to be capable of communicating with the channels 15. Switching-over between the first position and the second position is performed by rotating the valve element 14. Details of the operation of the switching valve 4 will be described later.

The switching valve 4 is not limited to the above-described rotary valve having the circular columnar shape insofar as two channels can be switched over by the switching valve. For example, the first position and the second position may be selectively taken by a slide valve of the type employing a flat plate in which recesses serving as channels are formed, and sliding the flat plate.

The supply channel 5 is a linear channel. The supply channel 5 has one opening that is directly or indirectly connected to the storage vessel 17 storing a liquid material 58, and the other opening that is connected to the switching valve 4 (valve element 14). The ejection channel 6 is a linear channel. The ejection channel 6 has one opening that is connected to the switching valve 4 (valve element 14), and the other opening that is connected to the nozzle 18 through which the liquid material 58 is discharged. In this embodiment, the supply channel 5 and the ejection channel 6 are arranged to extend perpendicularly to the liquid contact member 2 at opposite positions with the switching valve 4 located at a center. In other words, component layout is designed such that the channels extend in a crossed shape about a space where the valve element 14 is arranged. Correspondingly, the inner channels of the valve element 14 are formed such that the two measuring bores 11 are alternately communicated with the supply channel 5 and the ejection channel 6.

In the above-described liquid contact unit 7 in this embodiment, two portions of the liquid contact member 2 are arranged to lie on one linear line with the switching valve 4 interposed therebetween in a state where the opposite end sides of those two portions from which the pistons are inserted are located to face the exterior. Furthermore, the two connecting members 26 and 27 are arranged at the upper and lower sides with the switching valve 4 interposed therebetween. Thus, since the constituent members are arranged in a concentrated fashion about the switching valve 4 located at a center, the following advantageous effects are obtained. The channels can be formed linearly in shorter lengths, and the usage of a liquid (particularly the usage of a liquid, e.g., a pressure transmission medium, other than the discharged liquid) can be reduced significantly. Moreover, the pressure loss can be reduced, and responsibility can be increased.

In addition, since the liquid contact member 2 is formed as a single member, the advantageous effects are obtained in that time and labor required for the disassembling and cleaning operations, etc. can be reduced, and that connection errors in the assembling operation can be reduced.

[Driving Unit 10]

The driving unit 10 for operating movable members includes the valve driving mechanism 8 and the piston driving mechanism 9.

The valve driving mechanism 8 operates the valve element 14 of the switching valve 4. In this embodiment, a rotary actuator is employed as the valve driving mechanism 8, and motive power of the rotary actuator is transmitted to the switching valve 4. The valve driving mechanism 8 may be any suitable type, such as power- or air-operated type.

When the switching valve 4 is not the rotary type (when it is the slide type, for example), the valve driving mechanism 8 used in practice is properly modified depending on the valve type.

The piston driving mechanism 9 includes the arm 19 supporting the pistons 3 and operates the pistons 3 by reciprocally moving the arm 19. In the embodiment, the piston driving mechanism 9 employs a combination of an electric motor and a ball screw so that fine control can be performed. For example, a servo motor or a pulse motor can be used as the electric motor. A linear motor may be used instead of the above-mentioned combination. Regardless of which type of the motor is used, the motor preferably includes an encoder to realize position control with high accuracy.

The arm 19 supporting the pistons 3 is formed in a U-like shape, and the pistons 3 are fixed to respective fore ends of arm projections 20 that are projecting from both ends of the U-shaped arm 19. The smaller-diameter portions 12 of the pistons 3 are fixedly screwed to the arm projections 20 such that the smaller-diameter portions 12 are positioned to extend in opposing relation. A plate-like coupling portion for coupling the arm projections 20 of the arm 19 to each other is coupled to a slider 21 of the piston driving mechanism 9 to be freely movable together with the slider 21. The arm 19 is formed as one hard member, and its shape is invariable when the arm is reciprocally operated. Therefore, a distance between the two pistons (i.e., a distance from a distal end of one smaller-diameter portion 12 to a distal end of the other smaller-diameter portion 12) can be kept constant. Assuming here that the distance resulting from summing the "length of one measuring bore 11" and the "width of the valve element 14" is defined as an upper limit distance and the "width of the switching valve 4" is defined as a lower limit distance, the distance between the pistons fixed to the arm 19 is set to be not longer than the upper limit distance and not shorter than the lower limit distance. The reason is as follows. If the distance between the pistons is longer than the upper limit distance, the piston 3 would come out from the measuring bore 11 when the arm 19 is reciprocally moved. If the distance between the pistons is shorter than the lower limit distance, the operation of the piston 3 itself would be failed.

[Other Components]

The dispensing apparatus 1 includes a discharge controller 23 that controls not only the operations of the above-described two driving mechanisms (8, 9), but also gas pressure applied to the liquid material 58 stored in the storage vessel 17. The discharge controller 23 is disposed separately from the dispensing apparatus 1. By disposing a comprehensive control unit at one location in such a manner, setting values of various parameters can be managed more conveniently. Furthermore, the dispensing apparatus 1 includes a compressed gas source 22 for supplying compressed gas that is used to apply pressure to the liquid material 58 stored in the storage vessel 17. The compressed gas aids the operation of sucking the liquid material 58 into the measuring bore 11. The compressed gas source 22 is communicated with the storage vessel 17 through the discharge controller 23.

[Layout of Driving Unit]

The layout of the two driving mechanisms (8, 9) constituting the driving unit 10 will be described in detail below.

From the viewpoint of facilitating attachment and detachment of the liquid contact unit 7 from the front side, the two driving mechanisms (8, 9) are preferably installed adjacent to each other on the rear side of the liquid contact unit 7. In the liquid contact unit 7, however, because a piston center axis 56 and a valve element center axis 57 are positioned on the same plane perpendicularly to each other, it is difficult to install the two driving mechanisms (8, 9) for operating the valve element and the pistons to be simply arranged side by side. Taking into account such a point, the two driving mechanisms (8, 9) are disposed substantially adjacent each other in the vertical direction by arranging one driving mechanism on the same horizontal plane as the axes (56, 57) of the liquid contact unit 7 and the other driving mechanism in three-dimensionally overlapped relation to the one driving mechanism. The positional relationship between the two driving mechanisms (8, 9) can be set, for example, in accordance with one of the following two cases.

Figure 3:
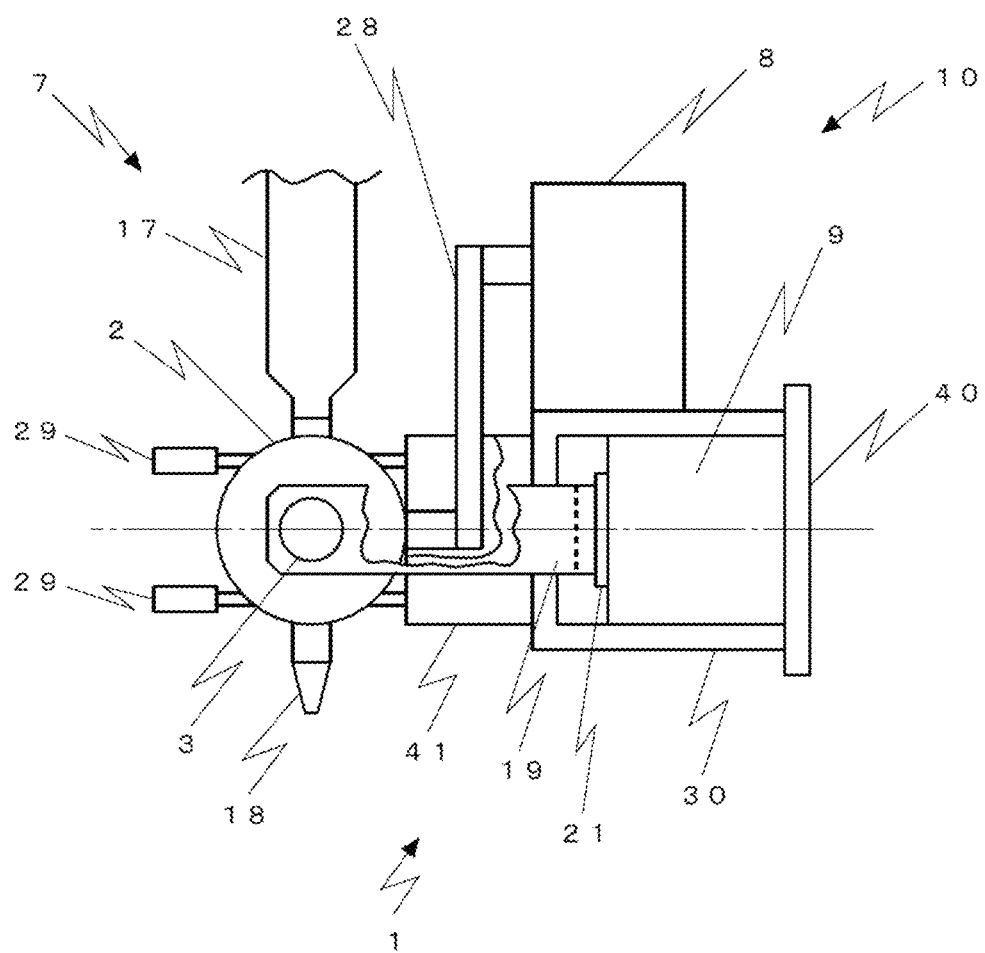
FIG. 3 is a side view to explain an arrangement (1) of driving mechanisms of a driving unit in the liquid dispensing apparatus according to the present invention.

(A) Layout Example in Which the Valve Driving Mechanism is Arranged at the Upper Side and the Piston Driving Mechanism is Arranged at the Lower Side FIG. 3 illustrates a layout example in which the valve driving mechanism 8 is arranged at the upper side and the piston driving mechanism 9 is arranged at the lower side in the dispensing apparatus 1. FIG. 3 is a side view of the dispensing apparatus, the view being partly illustrated in a seeing-through way. In FIG. 3, the left side corresponds to the front side, and the right side corresponds to the rear side.

In this layout example, the piston driving mechanism 9 is arranged on the same horizontal plane as the axes (56, 57) of the liquid contact unit 7, and the valve driving mechanism 8 is arranged above the piston driving mechanism 9. Because the valve driving mechanism 8 is arranged at the upper side, a power transmission member 28 is disposed for connection between the valve driving mechanism 8 and the liquid contact unit 7, and motive power of the valve driving mechanism 8 is transmitted to the valve element 14 of the switching valve 4 through the power transmission member 28. The piston driving mechanism 9 and the liquid contact unit 7 are coupled to each other by the arm 19 such that the pistons 3 are operated by operating the arm 19.

The liquid contact unit 7 is fixed to a fixation block 41 by fixtures 29, and the fixation block 41 is mounted to a U-shaped member 30. The fixtures 29 are each constituted by a rod portion and a fixing portion having a larger diameter than the rod portion. In this embodiment, a thumb-equipped screw is used as the fixture 29 such that the fixture 29 can be manually fastened and loosened with ease. A groove having a "minus" or "plus" shape or a "hexagonal hole", which are common in headed screws, may be formed in the fixing portion such that the fixture 29 can be fastened and loosened with a tool, e.g., a driver or a wrench. Using the tool enables the fixture 29 to be more tightly fastened and more reliably fixed than in the case of manually operating the fixture.

Between the piston driving mechanism 9 and the U-shaped member 30, there is a space allowing the arm 19 to move. The valve driving mechanism 8 is disposed on the U-shaped member 30. Because the piston driving mechanism 9 is generally larger (longer) and heavier, the layout of FIG. 3 in which the piston driving mechanism 9 is arranged at the lower side is advantageous in providing good weight balance. Furthermore, because an operation axis of the piston driving mechanism 9 and the center axis 56 of the pistons are positioned on the same plane, high positioning accuracy is obtained for the pistons 3.

Figure 4:
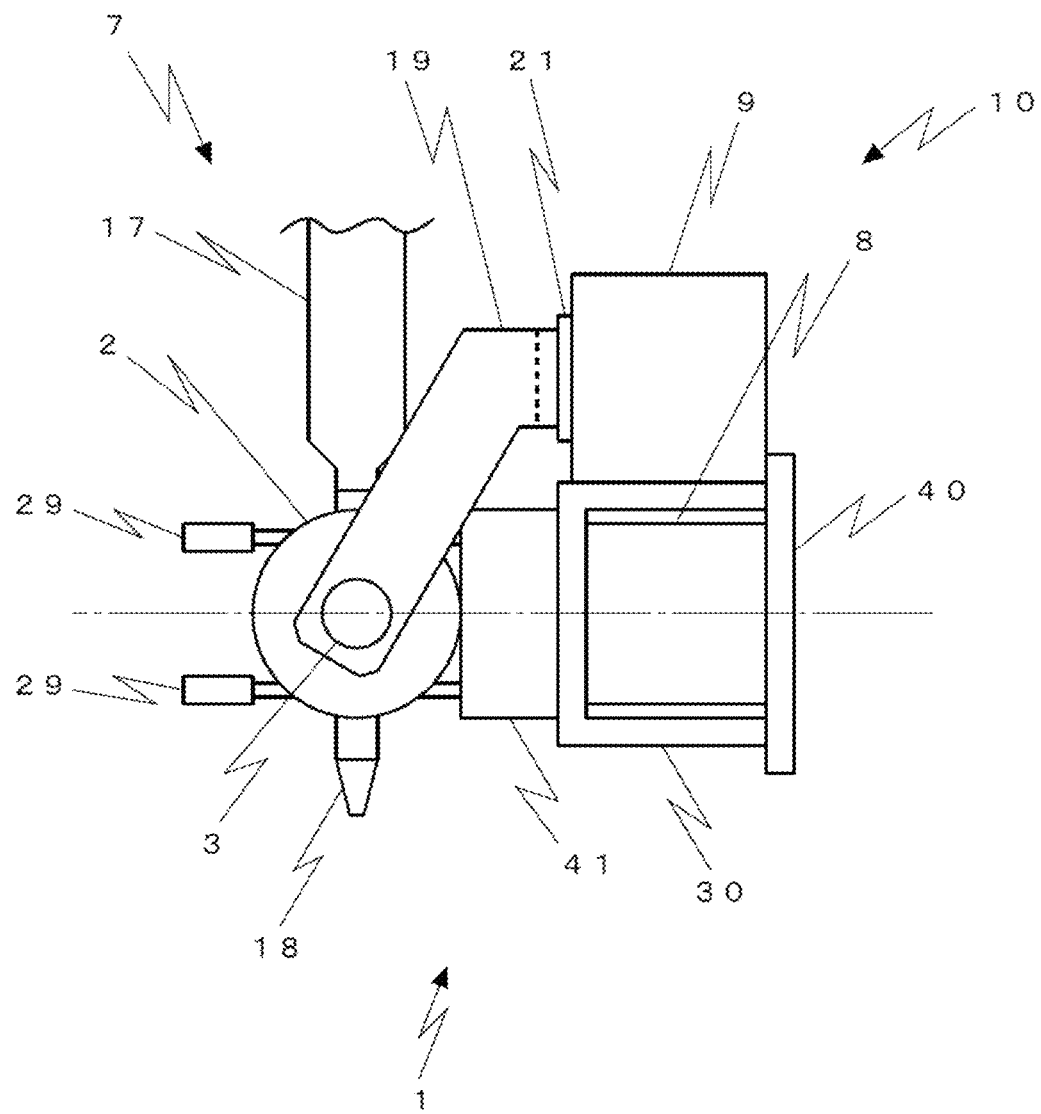
FIG. 4 is a side view to explain an arrangement (2) of the driving mechanisms of the driving unit in the liquid dispensing apparatus according to the present invention.

(B) Layout Example in Which the Valve Driving Mechanism is Arranged at the Lower Side and the Piston Driving Mechanism is Arranged at the Upper Side FIG. 4 illustrates a layout example in which the valve driving mechanism 8 is arranged at the lower side and the piston driving mechanism 9 is arranged at the upper side in the dispensing apparatus 1. FIG. 4 is a side view of the dispensing apparatus. In FIG. 4, the left side corresponds to the front side, and the right side corresponds to the rear side.

In this layout example, the valve driving mechanism 8 is arranged on the same horizontal plane as the axes (56, 57) of the liquid contact unit 7, and the piston driving mechanism 9 is arranged above the valve driving mechanism 8. The piston driving mechanism 9 and the liquid contact unit 7 are coupled to each other by the arm 19. Because the piston driving mechanism 9 is arranged at the upper side, the arm extending from the piston driving mechanism 9 is bent midway downwards such that the arm projections 20 extend while inclining downwards. The valve driving mechanism 8 and the liquid contact unit 7 are directly coupled to each other, and the power transmission member 28 is not interposed between them unlike the case of FIG. 3.

The liquid contact unit 7 is fixed to the U-shaped member 30 by the fixtures 29. The liquid contact unit 7 and the U-shaped member 30 may be fixed to each other with a block-like member (base) interposed between them. The piston driving mechanism 9 is disposed on the U-shaped member 30.

In the layout of FIG. 4, since the power transmission member 28 is not interposed between the liquid contact unit 7 and the driving unit 10, the back-to-front width of the apparatus can be shortened, and the apparatus weight can be reduced. Another advantage is that, since the switching valve 4 can be directly driven, valve responsibility to the switching operation is increased.

Which one of the above-described two layout examples is to be employed can be optionally determined, as appropriate, depending on the demanded performance and the situations in use. Regardless of which one of the above-described two layout examples is employed, however, the two driving mechanisms (8, 9) can be installed on the rear side of the liquid contact unit 7. Accordingly, when the liquid contact unit 7 is attached and detached from the front side, the attaching and detaching operations can be performed smoothly.

[Attachment and Detachment Between Liquid Contact Unit and Driving Unit]

Figure 5:
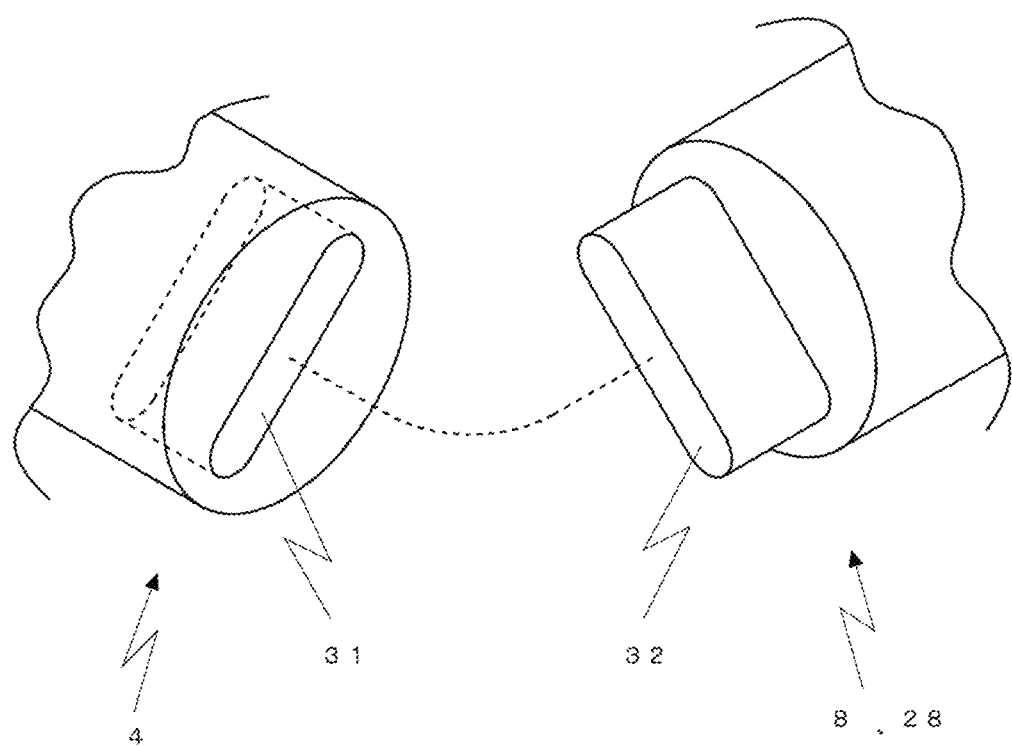
FIG. 5 is an enlarged view of principal parts for attaching and detaching the liquid contact unit in the liquid dispensing apparatus.

The apparatus preferably includes a contrivance for facilitating connection and disconnection or attachment and detachment between the switching valve 4 and the valve driving mechanism 8 (or the power transmission member 28). It is desirable to establish a state where motive power can be transmitted just by a fitting operation without using any fastening means, e.g., a screw. As illustrated in FIG. 5, for example, a slot 31 is formed in a lateral surface of the switching valve 4, and a protrusion 32 is provided at an end of the valve driving mechanism 8 (or the power transmission member 28). The slot 31 and the protrusion 32 are engageable with each other. While, in FIG. 5, the slot 31 and the protrusion 32 are each formed in an oblong shape in cross-section, the shapes of the slot 31 and the protrusion 32 are not limited to the illustrated one. It is just needed that at least one surface of each of the slot 31 and the protrusion 32 is a flat surface, or that, looking at a cross-section, at least one side thereof is a linear line. For example, the cross-section of each of the slot 31 and the protrusion 32 may have a "semicircular or semielliptical shape" or a "polygonal shape". Moreover, the following advantages are obtained by forming the slot 31 and the protrusion 32 in the above-described shapes. In the case of forming the slot 31 of the valve element 14 such that the orientation of the groove 31 has a predetermined positional relationship with respect to the channels 15 formed in the valve element, the positions or orientations of the ports 16 with which the channels 15 in the valve element 14 are communicated can be specifically decided just by fitting the slot 31 and the protrusion 32 even when an operator cannot see the inside of the liquid contact member 2.

In this embodiment, the liquid contact member 2 has two penetration holes 33 that allow the fixtures 29 to be inserted therethrough at positions out of interference with the measuring bores 11, and that are formed at symmetric positions with respect to the switching valve 4. The liquid contact unit 7 and the driving unit 10 are fixed to each other by two fixtures 29 each of which is made up of the rod portion and the fixing portion. In this embodiment, the operations of attaching and detaching the liquid contact unit 7 are facilitated for the reasons that the liquid contact member 2 is constituted as a single member, that the valve element 14 is arranged in the liquid contact member 2, and that the connecting members 26 and 27 are also fixed to the liquid contact member 2.

Detailed procedures for attaching and detaching the liquid contact unit 7 will be described below.

(1) Attachment

First, the fixtures 29 are inserted through the penetration holes 33 of the liquid contact member 2, thus attaching and fixing the liquid contact member 2 to the driving unit 10. At that time, the slot 31 of the valve element 14 and the protrusion 32 of the valve driving mechanism 8 (or the power transmission member 28) are engaged with each other concurrently (see FIG. 5). Next, the piston 3 is inserted through a hole at the fore end of the arm 19 and is then inserted through a piston insertion opening of the liquid contact member 2. Thereafter, the piston 3 is fixed by screwing the threaded region of the smaller-diameter portion 12 of the piston, which region is formed at the side close to the larger-diameter portion 13 of the piston, into the fore end of the arm 19. The above-described operations are performed for the two pistons 3. The attachment of the liquid contact unit 7 to the driving unit 10 is thus completed. In order to discharge a liquid, the storage vessel 17 storing the liquid is attached to the connecting member 26, and the two driving mechanisms (8, 9) are connected to the discharge controller 23. The nozzle 18 is preferably mounted prior to starting the above-described attaching operations.

(2) Detachment

The liquid contact unit 7 can be detached through procedures reversed to those described in the above (1). First, the storage vessel 17 and the discharge controller 23 are disconnected from each other. The nozzle 18 is preferably detached at the end of the detaching operation.

Next, the piston 3 is turned to loosen the screw and is then withdrawn out from the opening of the liquid contact member 2 and the hole at the fore end of the arm 19. Those operations are performed for the two pistons 3. Thereafter, the fixtures 29 are removed, and the liquid contact member 2 is detached from the driving unit 10. The operation of detaching the liquid contact unit 7 is thus completed. Prior to starting the detaching operation, the liquid material 58 in the dispensing apparatus 1 is preferably exhausted out to make the inside of the dispensing apparatus 1 empty. By so doing, the liquid material 58 can be avoided from not only adhering to the hands or the clothes of the operator, but also from contaminating the working place.

The above-described attaching and detaching operations can be easily performed even in a manual way because the pistons 3 and the fixing portions of the fixtures 29 are provided with the thumbs. Even if a tool is necessary for the attaching and detaching operations, those operations can be easily performed using an ordinary tool without needing a dedicated special tool. As a result of comparing the apparatus according to this embodiment and the prior-art apparatus having been manufactured so far by the applicant, a time required for disassembly and assembly was shortened from about 5 minutes to about 3 minutes.

[Discharge Operation]

The discharge operation will be described below with reference to FIGS. 6 to 12. FIGS. 6 to 12 illustrate only principal parts of the liquid contact unit 7 in a simplified fashion.

An initial state of the liquid contact unit 7 is set as follows. Either one of the pistons 3 is in a state most advanced in the liquid contact member 2. The switching valve 4 is positioned in a state that the measuring bore 11 at the side where the piston 3 is most advanced and the supply channel 5 are communicated with each other, and that the measuring bore 11 at the side where the piston 3 is most retreated and the ejection channel 6 are communicated with each other. More specifically, a state illustrated in FIG. 6, for example, is assumed to be the initial state. The dispensing apparatus 1 is assumed to be in an empty state where no liquid is supplied.

Figure 6:
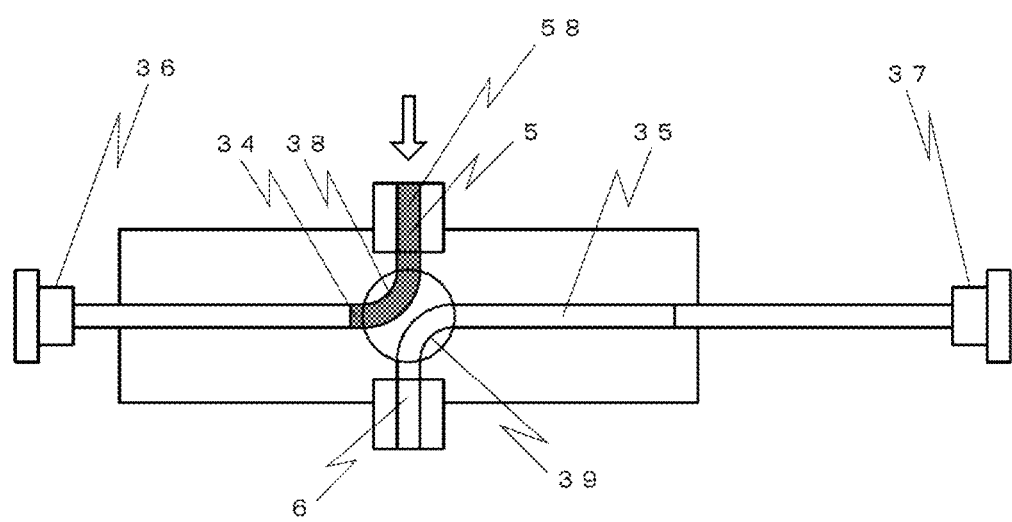
FIG. 6 is an explanatory view to explain a discharge operation (1) in the liquid dispensing apparatus.
Figure 7:
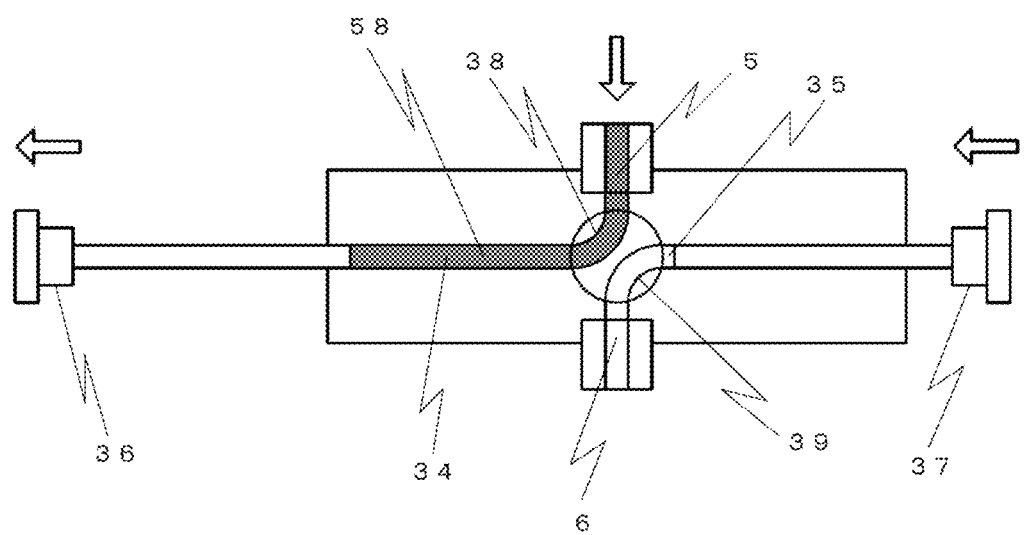
FIG. 7 is an explanatory view to explain a discharge operation (2) in the liquid dispensing apparatus.
Figure 8:
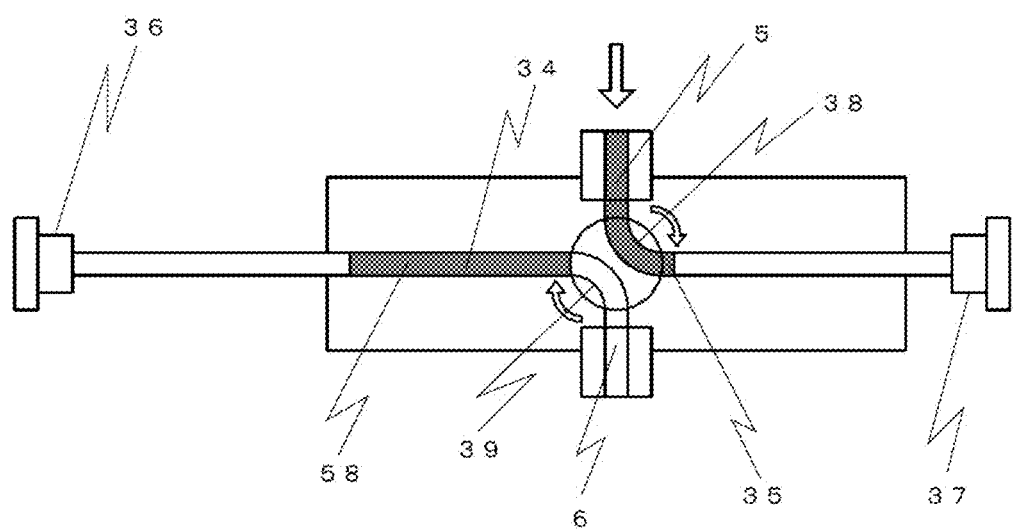
FIG. 8 is an explanatory view to explain a discharge operation (3) in the liquid dispensing apparatus.

The piston 3 and the measuring bore 11 arranged at the left side in FIGS. 6 to 12 are called a "first piston 36" and a "first measuring bore 34", respectively, whereas the piston 3 and the measuring bore 11 arranged at the right side are called a "second piston 37" and a "second measuring bore 35", respectively. The channel in the switching valve 4, which is communicated with the first measuring bore 34 in the initial state (FIG. 6) is called a "first channel 38", and the channel in the switching valve 4, which is communicated with the second measuring bore 35 in the initial state (FIG. 6) is called a "second channel 39". Moreover, the position taken by the switching valve 4 when the switching valve 4 is in the state illustrated in FIG. 6 is called a "first position", and the position taken by the switching valve 4 when the switching valve 4 is rotated clockwise through 90 degrees and is in the state illustrated in FIG. 8 is called a "second position".

(1) Start of Liquid Supply to First Measuring Bore (FIG. 6)

When the compressed gas is supplied to the storage vessel 17 (not illustrated in FIG. 6), the liquid material 58 is caused to flow into the first measuring bore 34 from the supply channel 5 after passing through the first channel 38 in the switching valve 4. here, applying pressure to the liquid material 58 by supplying the compressed gas to the storage vessel 17 is intended to ensure smooth supply of the liquid material 58 into the measuring bore. The pressure is preferably applied only when the piston is in a suction step.

(2) Suction Step of First Piston (FIG. 7)

When the first piston 36 is moved by the piston driving mechanism 9 in a direction to retreat from the first measuring bore 34, the liquid material 58 is sucked into the first measuring bore 34 by the action of the pressure applied to the storage vessel 17 and the action of the retreating operation of the first piston 36. On that occasion, the second piston 37 is caused to advance into the second measuring bore 35 corresponding to the retreat of the first piston 36 because the two pistons (36, 37) are fixed by the arm 19 such that the distance between the two pistons is held constant. At that time, however, the liquid material 58 is not ejected because the second measuring bore 35 is still in an empty state. After the end of the sucking operation, the application of pressure to the storage vessel 17 is stopped.

(3) Valve Switching-Over and Start of Liquid Supply to Second Measuring Bore (FIG. 8)

The valve driving mechanism 8 is operated to rotate the switching valve 4 clockwise through 90 degrees into the second position at which the first measuring bore 34 is communicated with the ejection channel 6 and the second measuring bore 35 is communicated with the supply channel 5. Furthermore, pressure is applied to the liquid material 58 in the storage vessel 17, whereby the liquid material 58 is caused to flow into the second measuring bore 35 from the supply channel 5 after passing through the first channel 38 in the switching valve 4.

Figure 9:
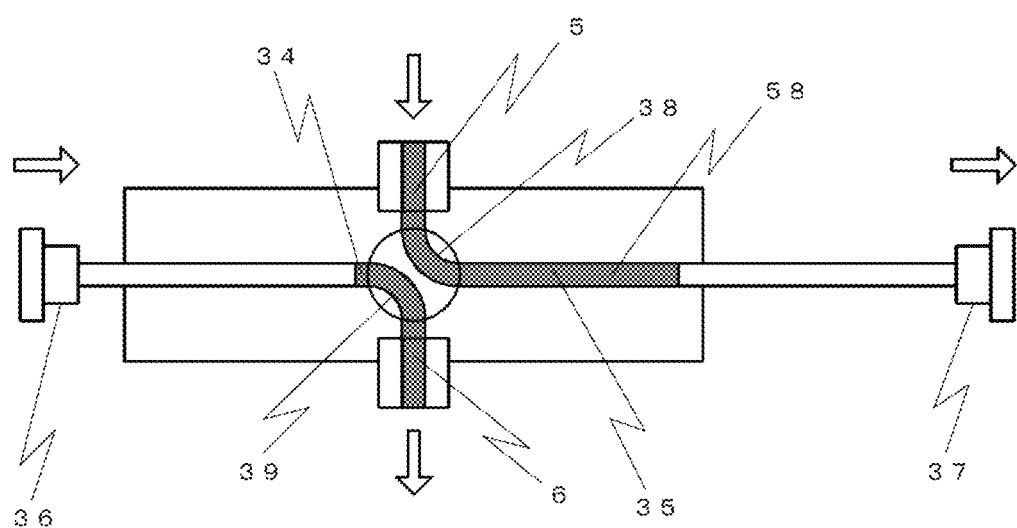
FIG. 9 is an explanatory view to explain a discharge operation (4) in the liquid dispensing apparatus.

(4) Suction Step of Second Piston and Ejection Step of First Piston (FIG. 9)

When the second piston 37 is moved by the piston driving mechanism 9 in a direction to retreat from the second measuring bore 35, the liquid material 58 is sucked into the second measuring bore 35 by the action of the pressure applied to the liquid material 58 and the action of the retreating operation of the second piston 37. On that occasion, the first piston 36 is caused to advance into the first measuring bore 34 corresponding to the retreat of the second piston 37 because the two pistons (36, 37) are fixed by the arm 19 such that the distance between the two pistons is held constant. Accordingly, the liquid material 58 having been sucked in the above (2) is ejected from the ejection channel 6 through the nozzle 18. In this respect, an ejection-side liquid vessel or the like for receiving the ejected liquid material 58 is preferably disposed under the ejection channel 6 (specifically, the nozzle 18). After the end of the sucking operation, the application of pressure to the storage vessel is stopped.

Figure 10:
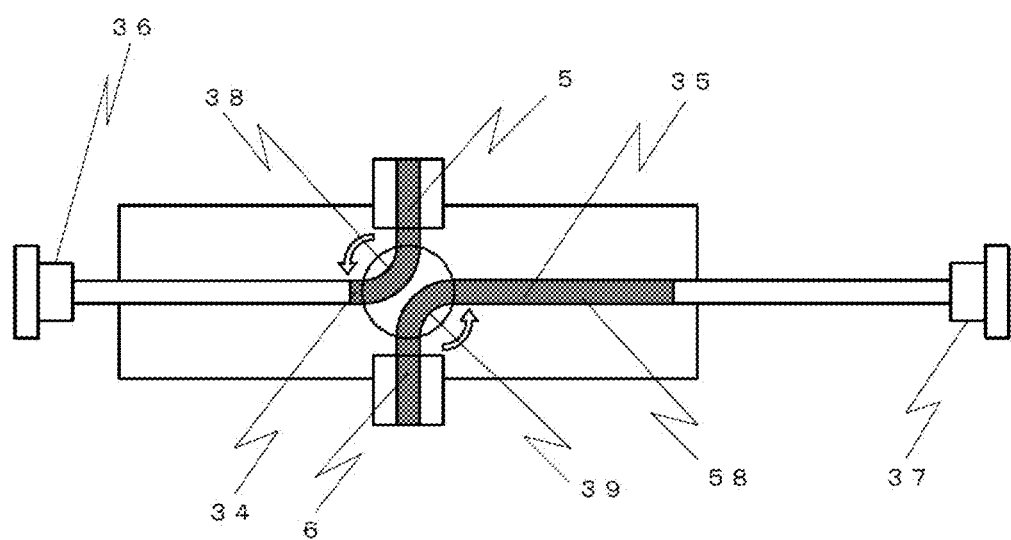
FIG. 10 is an explanatory view to explain a discharge operation (5) in the liquid dispensing apparatus.

(5) Valve Switching-Over (FIG. 10)

The valve driving mechanism 8 is operated to rotate the switching valve 4 counterclockwise through 90 degrees into the first position at which the first measuring bore 34 is communicated with the supply channel 5 and the second measuring bore 35 is communicated with the ejection channel 6.

Through the above-described steps, preparations for a discharge operation are completed. In other words, all the channels are filled with the liquid.

Figure 11:
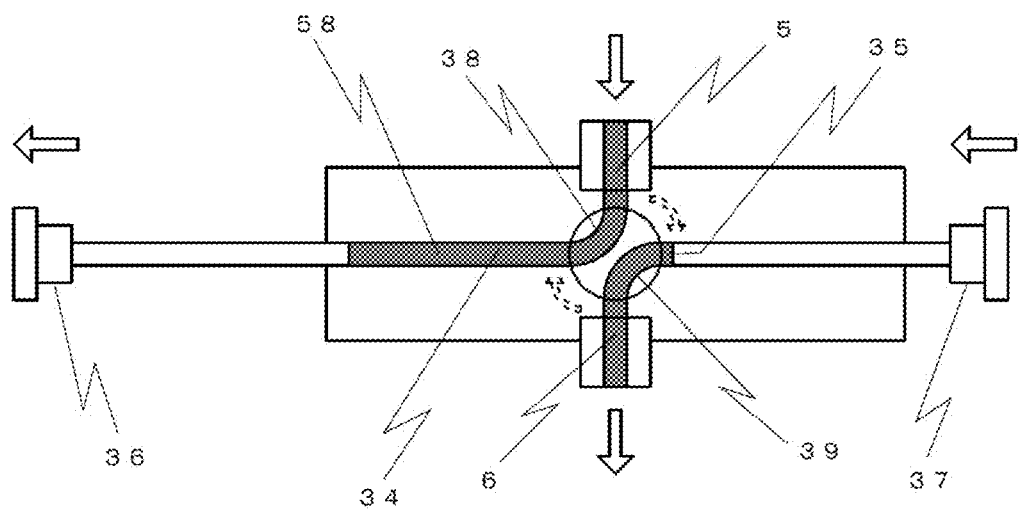
FIG. 11 is an explanatory view to explain a discharge operation (6) in the liquid dispensing apparatus.

(6) Discharge Operation 1: Ejection Step of Second Piston and Suction Step of First Piston (FIG. 11)

The piston driving mechanism 9 is operated to move the first piston 36 in the direction to retreat from the first measuring bore 34 and, at the same time, to move the second piston 37 in the direction to advance into the second measuring bore 35. As a result, the liquid material 58 is sucked into the first measuring bore 34 from the supply channel 5 after passing through the first channel 38 in the switching valve 4, while the liquid material 58 in the second measuring bore 35 is ejected (discharged) from the ejection channel 6 after passing through the second channel 39 in the switching valve 4.

After the end of the movements of the pistons (36, 37), the valve driving mechanism 8 is operated to rotate the switching valve 4 clockwise through 90 degrees into the second position at which the first measuring bore 34 is communicated with the ejection channel 6 and the second measuring bore 35 is communicated with the supply channel 6.

Figure 12:
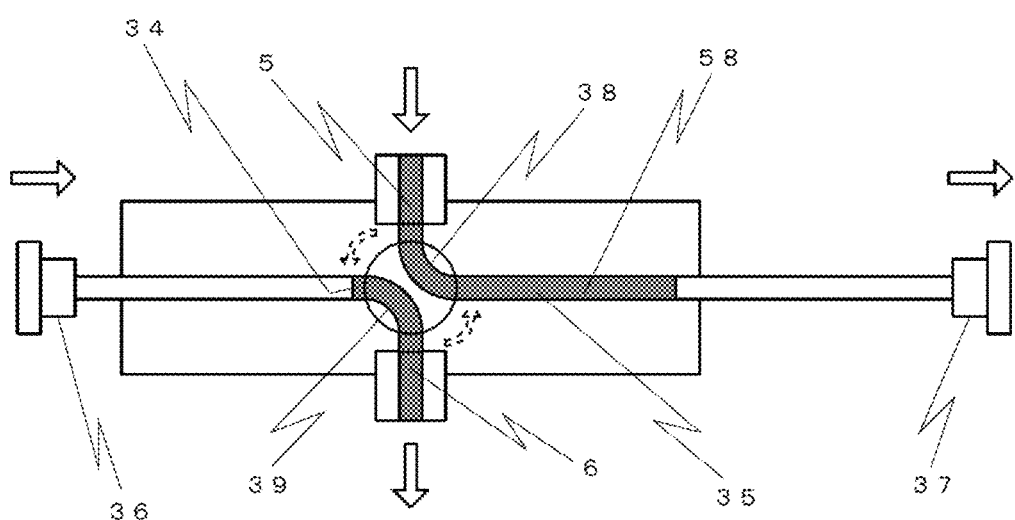
FIG. 12 is an explanatory view to explain a discharge operation (7) in the liquid dispensing apparatus.

(7) Discharge Operation 2: Ejection Step of First Piston and Suction Step of Second Piston (FIG. 12)

Operations in these steps are substantially the same as those in the above (6) except that the operations of the left and right pistons (36, 37) are reversed.

The piston driving mechanism 9 is operated to move the first piston 36 in the direction to advance into the first measuring bore 34 and, at the same time, to move the second piston 37 in the direction to retreat from the second measuring bore 35. As a result, the liquid material 58 in the first measuring bore 34 is ejected (discharged) from the nozzle 18 after passing through the second channel 39 in the switching valve 4 and then through the ejection channel 6, while the liquid material 58 is sucked into the second measuring bore 34 from the supply channel 5 after passing through the first channel 38 in the switching valve 4.

After the end of the movements of the pistons (36, 37), the valve driving mechanism 8 is operated to rotate the switching valve 4 counterclockwise through 90 degrees into the first position at which the first measuring bore 34 is communicated with the supply channel 5 and the second measuring bore 35 is communicated with the ejection channel 6.

When the discharge of the liquid material 58 is continued subsequently, the above-described operations (6) and (7) are repeated until reaching a preset lower limit of the remaining amount of the liquid material 58 in the storage vessel 17 or the pot life of the liquid material 58.

As described above, since the piston and the measuring bore are each disposed plural (two in this embodiment), the discharge and the suction can be performed alternately, and there is no need of stopping the discharge whenever the suction is performed. Therefore, when the liquid material is discharged successively, it is possible to cut a dead time and to shorten the time required for the discharge operation.

Second Embodiment

Figure 13:
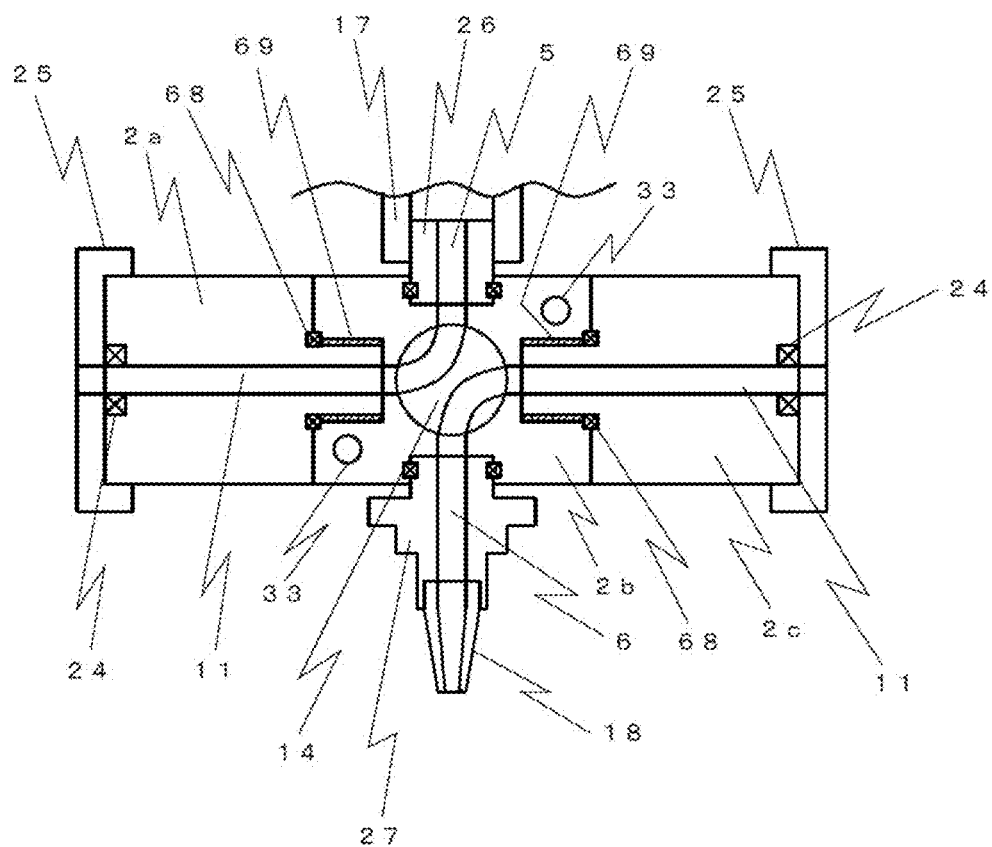
FIG. 13 is a front view, partly sectioned in principal parts, of a liquid contact unit in a second embodiment of the present invention.

A second embodiment is different from the first embodiment in that the liquid contact member 2 is constituted by a plurality of members. FIG. 13 is a sectional view of principal parts of a liquid contact unit in the liquid dispensing apparatus according to the present invention. More specifically, FIG. 13 is a front sectional view of the apparatus, the view illustrating the liquid contact member 2, the connecting member 26 and the storage vessel 17 communicating therewith, the connecting member 27 and the nozzle 18 communicating therewith, and the switching valve 4 at respective cross-sections taken along the center of the liquid contact member 2. Other components than the liquid contact member 2 are the same as those in the first embodiment, and description of those components is omitted here.

The liquid contact member 2 in this embodiment is constituted by three liquid contact members 2a to 2c. A measuring bore 11 is formed in each of the liquid contact members 2a and 2c to serve as a channel for allowing a liquid to be sucked therein and temporarily storing the sucked liquid. A space in which a valve element 14 is to be arranged is formed in the liquid contact member 2b. A sealing member 68 is disposed in a portion 69 where adjacent two of the liquid contact members 2a to 2c are engaged with each other. The engagement portion 69 may be constituted with, e.g., screwing or fitting.

In the above-described liquid contact unit 7 according to this embodiment, the measuring bore 11 can be easily replaced with any of other ones having different channel lengths or different diameters.

Furthermore, as in the first embodiment, since the constituent members are arranged in a concentrated fashion about the switching valve 4 located at a center, the following advantageous effects are obtained. The channels can be formed linearly in shorter lengths, and the usage of a liquid (particularly the usage of a liquid, e.g., a pressure transmission medium, other than the discharged liquid) can be reduced significantly. The pressure loss can be reduced, and responsibility can be increased.

Third Embodiment

Figure 14:
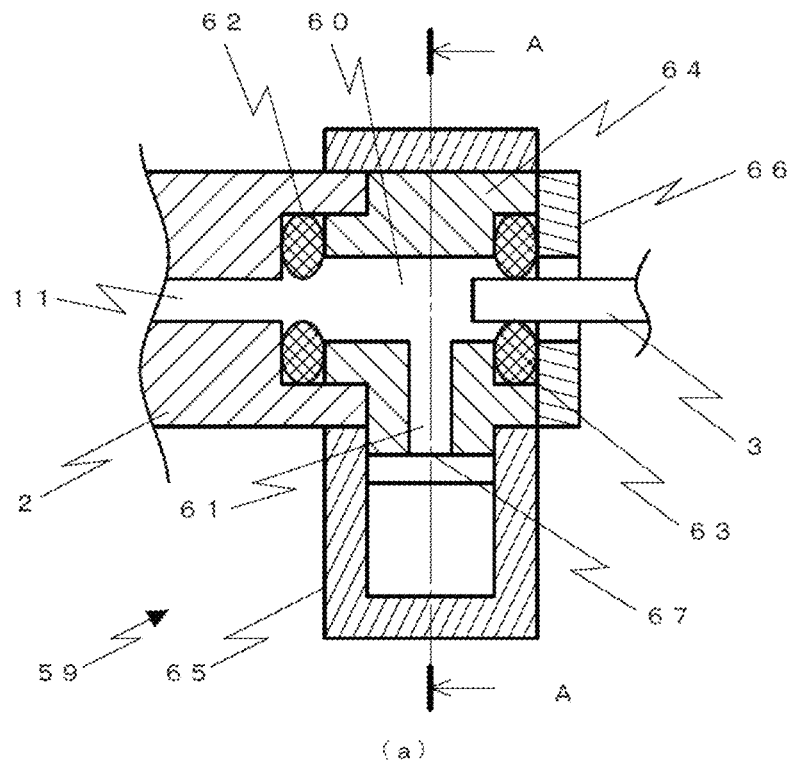
FIG. 14 is an explanatory view of a bubble mixing prevention mechanism in a third embodiment of the present invention. Specifically.
Figure 14:
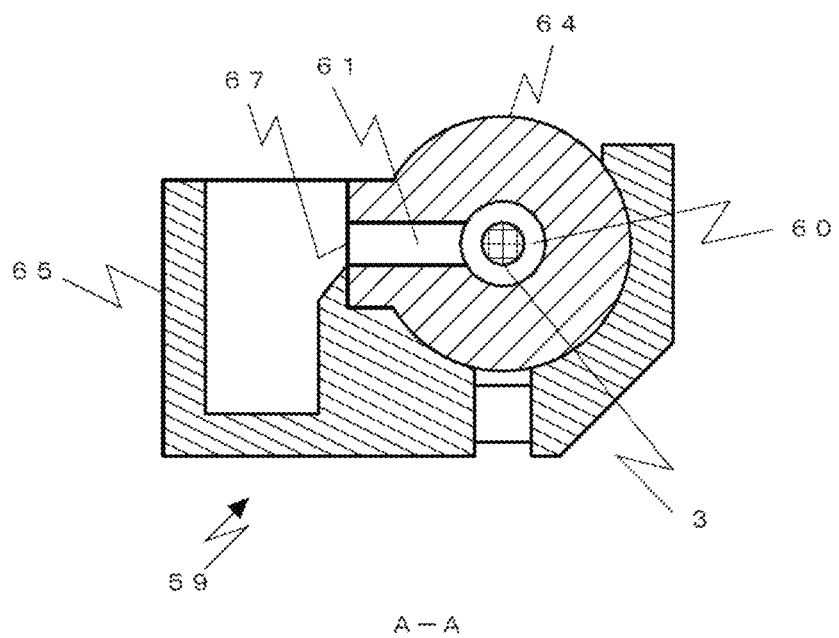

A third embodiment is different from the first embodiment in a point of incorporating a mechanism and a method to prevent mixing of a bubble. FIG. 14 is an explanatory view of the bubble mixing prevention mechanism in the third embodiment of the present invention. Specifically, FIG. 14(a) is a plan sectional view, and FIG. 14(b) is a sectional view taken along A-A in FIG. 14(a). Other components than the bubble mixing prevention mechanism are the same as those in the first embodiment, and description of those components is omitted here.

In a piston-type (plunger-type) discharge apparatus, when an operation of filling the liquid material 58 into the measuring bore is performed, there occurs a phenomenon that a bubble is generated due to pressure reduction caused upon retreat of a piston (plunger), or that a bubble remains in a portion not filled with the liquid material 58, e.g., at a corner of the channel. If a bubble is mixed in the liquid material 58, an amount of the discharged liquid material 58 could not be stably kept constant with respect to the stroke of the piston (plunger) under the influence of compressibility of the bubble, and precision discharge cannot be realized. In particular, the bubble tends to remain in the channel during the procedures for filling the liquid from the empty state (i.e., in the above (1) to (5) of [Discharge Operation]). To cope with such a drawback, this embodiment includes the bubble mixing prevention mechanism illustrated in FIG. 14.

The bubble mixing prevention mechanism illustrated in FIG. 14 includes a first bore 60 that is communicated with the measuring bore 11 and that allows the piston 3 to reciprocally move therein, a first sealing member 62 disposed at an end of the first bore 60 on the side closer to the nozzle, a second sealing member 63 disposed at an end of the first bore on the side opposite to the nozzle, and a second bore 61 communicating with a lateral surface of the first bore. Furthermore, an inner circumference of the first bore 60 has a larger diameter than an outer circumference of the piston 3. Respective inner circumferences of the first sealing member 62 and the second sealing member 63 have substantially the same diameter as the outer circumference of the piston 3, and respective outer circumferences of the first sealing member 62 and the second sealing member 63 have a larger diameter than the inner circumference of the first bore 60. In addition, a liquid receiver 65 is provided adjacent to the second bore 61 at the side opposite to the first bore 60 (i.e., the side including an open end 67 of the second bore).

With the mechanism constituted as described above, mixing of a bubble can be prevented by, when the liquid material 58 is filled into the measuring bore 11, by executing a first step of moving the piston 3 to a point between an outer end position of a region where the second bore 61 and the first bore 60 are communicated with each other and the second sealing member 63, a second step of supplying the liquid material 58 to the measuring bore 11 at least until the liquid material 58 is spilled out from the end 67 of the second bore 61 at the side opposite to the first bore 60, and a third step of moving the piston 3 until abutting against the first sealing member 62. In this embodiment, the bubble mixing prevention mechanism is preferably provided at each of the ends of the two measuring bores 11 on the side opposite to the switching valve 4. With such an arrangement, bubbles can be surely prevented from mixing into the measuring bores 11.

Other simple methods for removing bubbles may be used without providing the above-described bubble mixing prevention mechanism. Thus, the bubbles can also be simply removed by the following procedures.

First, in addition to the above-described operation of (2) in [Discharge Operation], the first piston 36 is removed after the end of the operation, and pressure is applied again to the liquid material 58. At the timing when the liquid material 58 is spilled out from the piston insertion side of the first measuring bore 34, the application of the pressure is stopped, and the first piston 36 is inserted into the first measuring bore 34.

Secondly, in addition to the above-described operation of (4) in [Discharge Operation], the second piston 37 is removed after the end of the operation, and pressure is applied again to the liquid material 58. At the timing when the liquid material 58 is spilled out from the piston insertion side of the second measuring bore 35, the application of the pressure is stopped, and the second piston 37 is inserted into the second measuring bore 35.

By additionally performing those two operations, bubbles can be prevented from being mixed into the channels. When spilling out the liquid material 58 from the measuring bore, an ejection-side liquid vessel or the like for receiving the spilled liquid material 58 needs to be disposed under the corresponding end of the measuring bore. The ejection-side liquid vessel used in the above-described discharge operation may be further used in that case.

By preventing mixing of bubbles into the channels with the above-described mechanism and method, an amount of the discharged liquid material 58 can be stably kept constant with respect to the stroke of the plunger (piston) without suffering from the influence of compressibility of the bubbles, and precision discharge can be realized. As a result of comparing the apparatus according to this embodiment and the prior-art apparatus having been manufactured so far by the applicant, the precision was improved from about ±7% to about ±3% in terms of variation in the amount of the discharged liquid material.

Details of the present invention will be described below in connection with Examples, but the present invention is in no way limited by the following Examples.

Example 1

Figure 15:
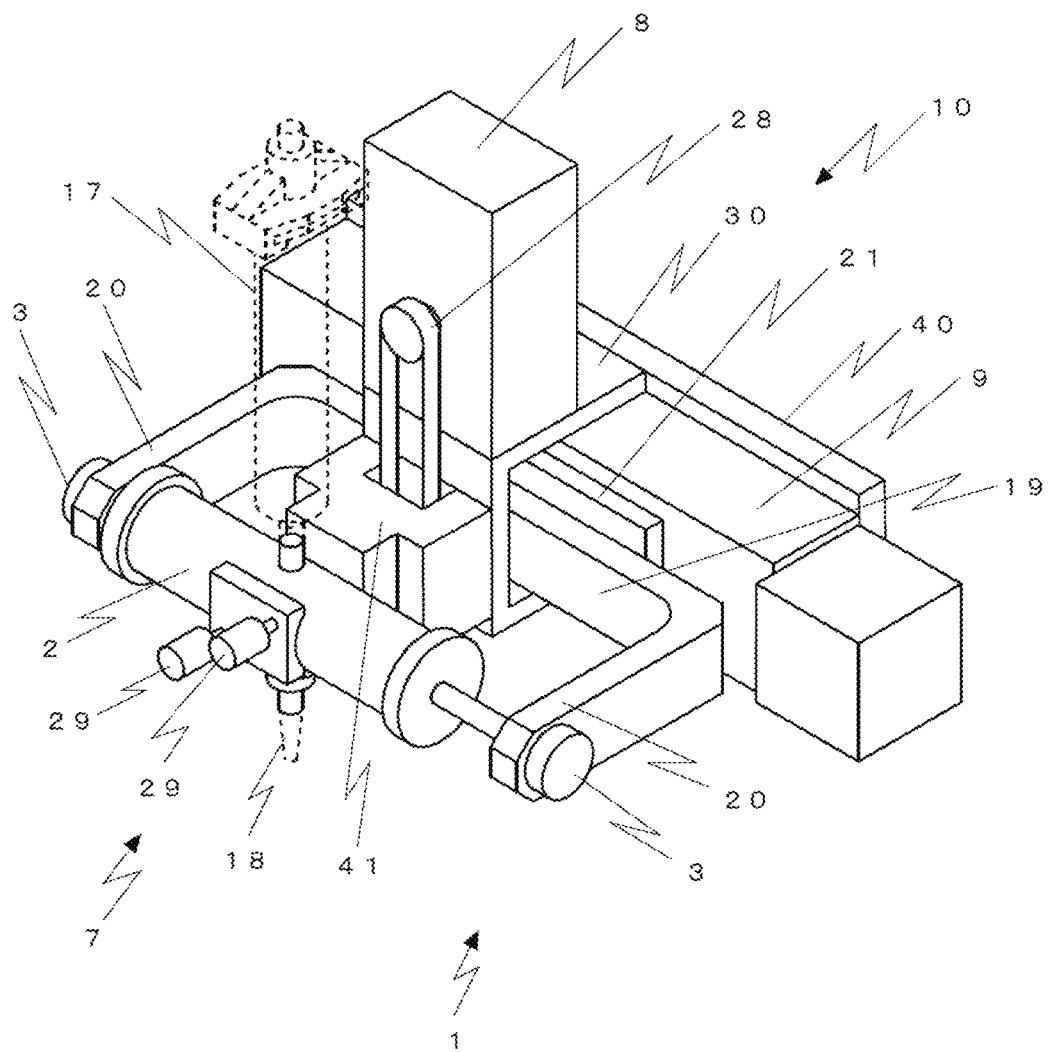
FIG. 15 is a schematic perspective view of a liquid dispensing apparatus according to Example 1.

A dispensing apparatus 1 according to Example 1 is a practical one of the dispensing apparatus 1 including the driving unit 10 of the layout, described in the above embodiment, in which the valve driving mechanism 8 is arranged at the upper side and the piston driving mechanism 9 is arranged at the lower side (see FIG. 3). FIG. 15 is a schematic perspective view of the dispensing apparatus according to Example 1.

The liquid contact unit 7 including the liquid contact member 2, the pistons 3, the switching valve 4, the storage vessel 17, the nozzle 18, and so on is disposed at the front side of the apparatus. The driving unit 10 including the valve driving mechanism 8 and the piston driving mechanism 9 is disposed at the rear side of the liquid contact unit 7. In the following, description of similar components to those in the above embodiment is omitted, and different components are described.

The liquid contact unit 7 includes the liquid contact member 2, the two pistons 3 sliding in the liquid contact member 2 in close contact therewith, the switching valve 4, the connecting member 26 having the supply channel 5 formed therein, and the connecting member 27 having the ejection channel 6 formed therein. In the liquid contact member 2, the two pistons 3 are arranged to lie on one linear line with the switching valve 4 interposed therebetween in a state where the pistons are inserted to the liquid contact member 2 from its opposite ends, which are located to face the exterior. Furthermore, the supply channel 5 and the ejection channel 6 are arranged in relation opposing to each other in the vertical direction and are disposed to extend perpendicularly to the liquid contact member 2.

The driving unit 10 includes the valve driving mechanism 8 and the piston driving mechanism 9. The valve driving mechanism 8 is disposed on a U-shaped support member 30 that is mounted to a base plate 40. The piston driving mechanism 9 is disposed in a recess of the U-shaped support member 30. The slider 21 is disposed in association with the piston driving mechanism 9, and the arm 19 for fixedly holding the pistons 3 is fixed to the slider 21. The slider 21 and the arm 19 are mounted in a state not in contact with an inner wall surface of the U-shaped support member 30 such that they are movable in the recess of the support member 30. Stated in another way, a length of legs (i.e., a depth of the recess) of the U-shaped support member 30 exceeds a total of respective thicknesses of the piston driving mechanism 9, the slider 21, and the arm 19. With such an arrangement, the slider 21 and the arm 19 are avoided from contacting with the support member 30 and from impeding the operation or from generating dust, etc. through abrasion.

In this Example, because the valve driving mechanism 8 is disposed above the piston driving mechanism 9, a mechanism for transmitting the motive power of the valve driving mechanism 8 to the valve element 14 of the switching valve 4 is required. As such a mechanism, in this Example, motive power of a rotary actuator is transmitted to the valve element 14 of the switching valve 4 through the power transmission member 28 that is constituted by a belt, including a belt bearing shaft (not illustrated). The power transmission member 28 is not limited to the belt, and it may be constituted by, e.g., a chain or a combination of a rack and a pinion. The power transmission member 28 is inserted through a space between the support member 30 and the fixation block 41 in a state not in contact therewith. The fixation block 41 is detachably fixed to the support member 30 and has a Y-like shape when viewed from above. The belt bearing shaft is inserted through the fixation block 41 and has the protrusion 32 at its axial end (see FIG. 5). The valve element 14 has the groove 31 that is engageable with the protrusion 32. The two penetration holes 33 are formed in the liquid contact member 2, and the liquid contact member 2 is fixed to the fixation block 41 by the two fixtures 29 each of which is made up of the rod portion and the fixing portion (see FIG. 3).

The driving unit 10 is preferably covered with a cover. This is intended to not only avoid a hand or a tool from being caught by moving parts, such as the slider 21 and the power transmission member (belt) 28, but also to prevent small pieces of dust and parts, i.e., foreign matters possibly causing troubles in the operation, from adhering to the components.

Example 2

Figure 16:
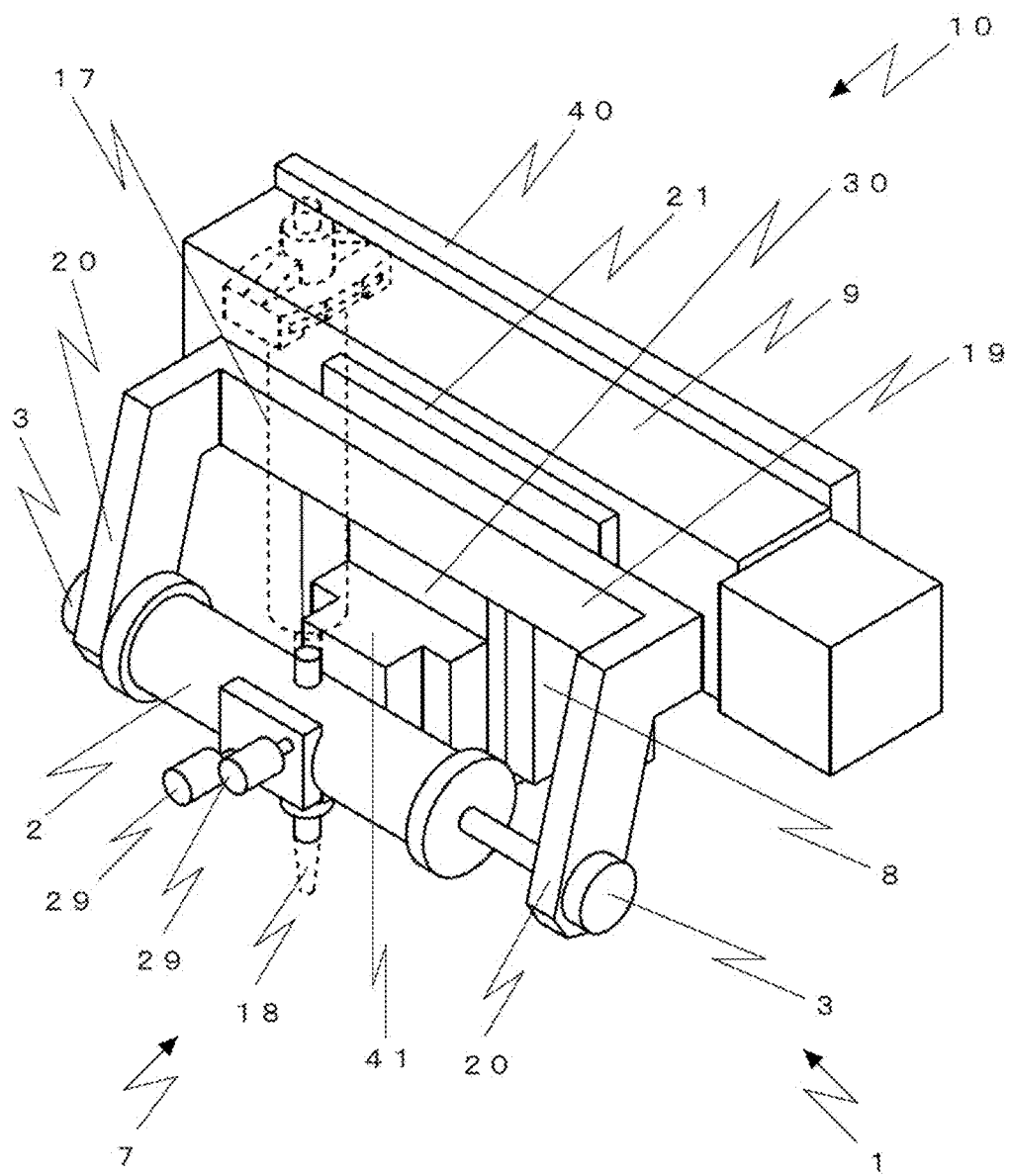
FIG. 16 is a schematic perspective view of a liquid dispensing apparatus according to Example 2.

A dispensing apparatus 1 according to Example 2 is a practical one of the dispensing apparatus 1 including the driving unit 10 of the layout, described in the above embodiment, in which the valve driving mechanism 8 is arranged at the lower side and the piston driving mechanism 9 is arranged at the upper side (see FIG. 4). FIG. 16 is a schematic perspective view of the dispensing apparatus according to Example 2. Example 2 is different from Example 1 in the layout of the driving mechanisms (8, 9) and connection forms between the driving mechanisms (8, 9) and the liquid contact unit 7. In the following, only points different from Example 1 are described.

In this Example, because the piston driving mechanism 9 is disposed above the valve driving mechanism 8, a mechanism for transmitting the motive power of the piston driving mechanism 9 to the pistons 3 is required. On the other hand, there is a demand for reducing the number of parts constituting the liquid contact unit 7 to the least necessary number. To cope with those problems, in this Example, the motive power of the piston driving mechanism 9 is transmitted to the pistons 3 by employing the arm 19 having a bent shape. In more detail, the motive power of the piston driving mechanism 9 is transmitted through the arm 19 having the projections 20 formed at both the arm ends in such a downward inclined shape as allowing the pistons 3 to be fixed to the projections 20 in a freely slidable manner on the center axes of the measuring bores of the liquid contact unit 7. Alternatively, the arm 19 having a linear shape may be used instead of using the arm 19 having the bent shape, and the U-shaped support member 30 may be used to be able to fixedly support the piston driving mechanism 9 in an inclined posture.

The liquid contact member 2 is detachably fixed to the fixation block member 41 that is fixed to the U-shaped support member 30. The liquid contact member 2 is fixed, in the same manner as in Example 1, by inserting the two fixtures 29 through the two penetration holes 33 that are formed in the liquid contact member 2. The fixation block member 41 includes a penetration hole through which a power shaft of the valve driving mechanism 8 is inserted. The protrusion 32 is provided at an end of the power shaft of the valve driving mechanism 8, and the groove 31 engageable with the protrusion 32 is provided in the valve element 14. Whether to dispose the fixation block member 41 or not is a matter optionally selectable depending on the distance from the piston driving mechanism 9 to the piston 3, etc. Also in Example 2, the driving unit 10 is preferably covered with a cover as in Example 1.

Example 3

Figure 17:
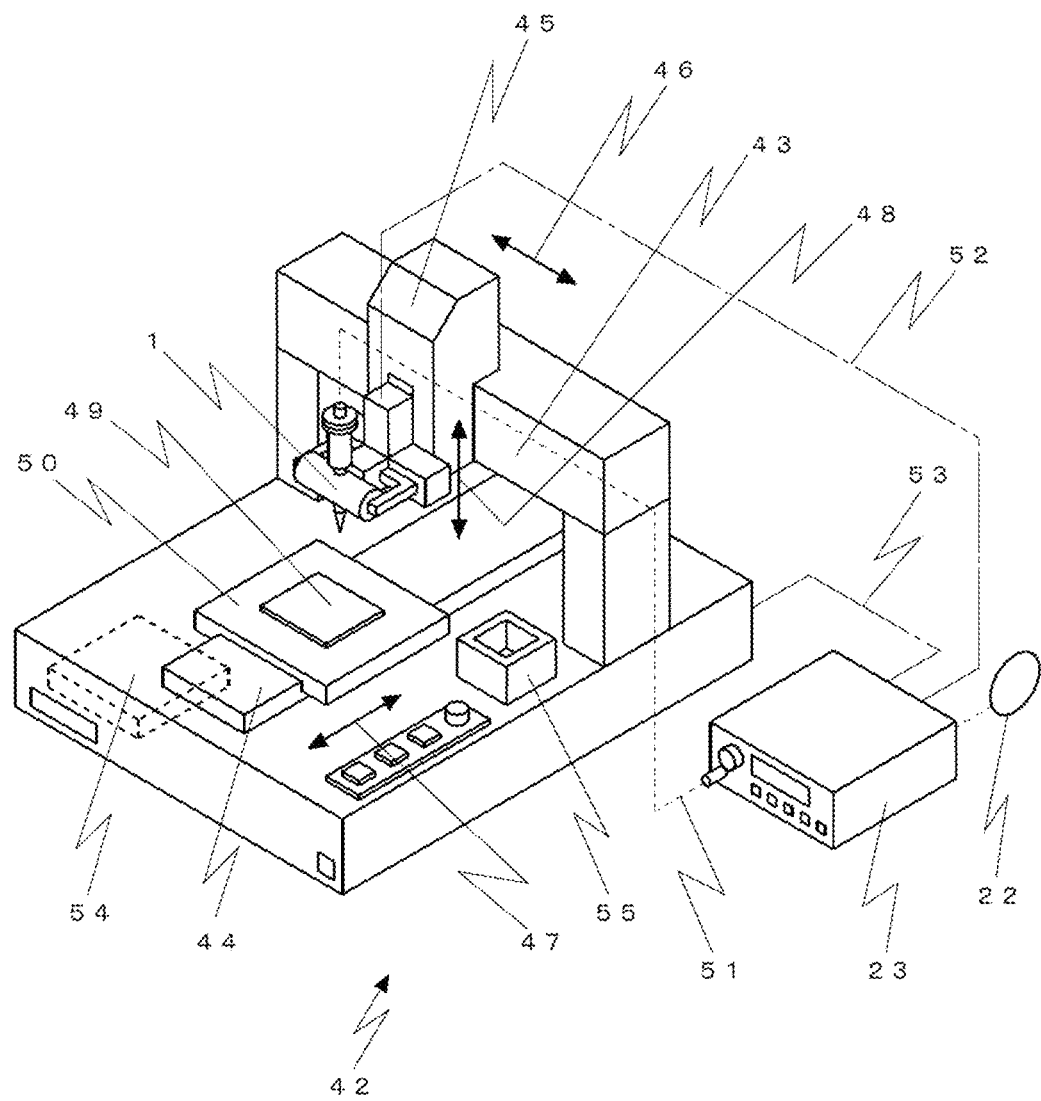
FIG. 17 is a schematic perspective view of a coating apparatus according to Example 3.

Example 3 relates to a desktop type coating apparatus that incorporates the dispensing apparatus 1 according to Example 1. FIG. 17 is a schematic perspective view of the coating apparatus according to Example 3.

A coating apparatus 42 according to this Example includes an X driving mechanism 43 that is movable in a direction denoted by a reference symbol 46, a Y driving mechanism 44 that is movable in a direction denoted by 47, and a Z driving mechanism 45 that is movable in a direction denoted by 48. The dispensing apparatus 1 is mounted on the Z driving mechanism 45, and the Z driving mechanism 45 is mounted on the X driving mechanism 43. A work table 50 on which a coating target 49 is placed is mounted on the Y driving mechanism 44. Thus, the dispensing apparatus 1 is movable in the XYZ directions (46, 47, 48) relative to the coating target 49.

Moreover, the discharge controller 23 is mounted in association with the coating apparatus 42. In accordance with the discharge controller 23, the compressed gas for feeding the liquid material 58 under pressure and the motive power for driving the pistons 3 and the valve 4 are supplied to the dispensing apparatus 1 from a compressed gas line 51 and a power line 52, respectively. The discharge controller 23 is further able to control the amount of the discharged liquid material by controlling, e.g., the stroke and the moving speed of each piston 3 of the dispensing apparatus 1. In addition, because the discharge control 23 is connected through a control line 53 to a driving controller 54 for controlling respective operations of the XYZ driving mechanisms (43, 44, 45), the liquid material can be discharged in conformity with the operations of the XYZ driving mechanisms (43, 44, 45).

The preparation stage of filling the liquid material 58 into the empty channels in the dispensing apparatus 1 (see FIG. 6 or 12) includes the operation of ejecting the liquid material 58. Therefore, it is preferable to dispose, on a bench, a vessel 55 that receives the ejected liquid material 58. An upper surface of the vessel 55 in this Example has a large opening to be able to easily receive the liquid material 58. The vessel 55 is installed at a position within a movable range of the dispensing apparatus 1 and out of interference with the movement of the work table 50. When the coating target 49 is small and there is a sufficient allowance in a space on the work table 50, the vessel 55 may be installed on the work table 50. The ejected liquid material 58 may be treated manually or automatically. In the case of manual treatment, the vessel 55 is detachably installed, and when the vessel 55 is filled with the ejected liquid material 58, it is removed to discard the ejected liquid material. In the case of automatic treatment, a tube is connected to the vessel 55 such that the ejected liquid material is drained to, e.g., another vessel by the action of a pump, for example.

LIST OF REFERENCE SYMBOLS

1: dispensing apparatus, 2: liquid contact member, 3: piston, 4: switching valve, 5: supply channel, 6: ejection channel, 7: liquid contact unit, 8: valve driving mechanism, 9: piston driving mechanism, 10: driving unit, 11: measuring bore, 12: smaller-diameter portion, 13: larger-diameter portion, 14: valve element, 15: channel, 16: communication port, 17: storage vessel (storage unit), 18: nozzle, 19: arm, 20: arm projection, 21: slider, 22: compressed air source, 23: discharge controller, 24: sealing member, 25: seal retaining member, 26: connecting member (for supply), 27: connecting member (for ejection), 28: power transmission member, 29: fixture, 30: U-shaped member, 31: slot, 32: protrusion, 33: penetration hole, 34: first measuring bore, 35: second measuring bore, 36: first piston, 37: second piston, 38: first channel, 39: second channel, 40: base plate, 41: fixation block, 42: coating apparatus, 43: X driving mechanism, 44: Y driving mechanism, 45: Z driving mechanism, 46: X moving direction, 47: Y moving direction, 48: Z moving direction, 49: coating target, 50: work table, 51: compressed gas line, 52: power line, 53: control line, 54: driving controller, 55: vessel, 56: center axis of piston, 57: center axis of valve element, 58: liquid material, 59: bubble mixing prevention mechanism, 60: first bore, 61: second bore, 62: first sealing member, 63: second sealing member, 64: block member, 65: liquid receiver, 66: seal retaining plate, 67: open end of second hole, 68: sealing member, and 69: engaged portion

The invention claimed is:

1. A liquid dispensing apparatus that sucks a liquid into a measuring bore and ejects the liquid in the measuring bore by moving a piston reciprocally, the liquid dispensing apparatus comprising:

a liquid contact member that has first and second measuring bores;
a first piston sliding in the first measuring bore in close contact therewith and a second piston sliding in the second measuring bore in close contact therewith;
a supply channel communicating with a storage unit;
an ejection channel communicating with a nozzle;
a switching valve that is disposed in an inner space of the liquid contact member, and that has a first position at which the first measuring bore is communicated with the supply channel and the second measuring bore is communicated with the ejection channel, and a second position at which the first measuring bore is communicated with the ejection channel and the second measuring bore is communicated with the supply channel;
a valve driving mechanism that operates the switching valve;
a connecting member for supply, which has the supply channel therein and which is detachably attached to an upper portion of the liquid contact member and to which a storage vessel is connected;
a connecting member for ejection, which has the ejection channel therein and which is detachably attached to a lower portion of the liquid contact member and to which the nozzle is connected; and
a piston driving mechanism that operates an arm connected to the first and second pistons,
wherein the liquid contact member is detachably attached to the liquid dispensing apparatus,
the first and second measuring bores are arranged to oppose to each other on both sides of the switching valve, and
the supply channel and the ejection channel are arranged adjacent to the switching valve.

2. The liquid dispensing apparatus according to claim 1, wherein the arm holds constant a distance between the first and second pistons.

3. The liquid dispensing apparatus according to claim 2, wherein the liquid contact member including the switching valve disposed in an inner space thereof is detachably attached to the liquid dispensing apparatus.

4. The liquid dispensing apparatus according to claim 2, wherein the liquid contact member is constituted as a single member.

5. The liquid dispensing apparatus according to claim 2, wherein the switching valve includes a valve element that has two channels therein.

6. The liquid dispensing apparatus according to claim 1, wherein the liquid contact member is constituted as a single member.

7. The liquid dispensing apparatus according to claim 1, wherein the switching valve includes a valve element that has two channels therein.

8. The liquid dispensing apparatus according to claim 1, wherein the valve driving mechanism and the piston driving mechanism are disposed at rear side of the liquid contact member adjacent to each other in a vertical direction.

9. The liquid dispensing apparatus according to claim 1, wherein the valve driving mechanism is disposed above the piston driving mechanism and includes a power transmission member through which motive power is transmitted to the switching valve.

10. The liquid dispensing apparatus according to claim 1, wherein the piston driving mechanism is disposed above the valve driving mechanism, and
the valve driving mechanism and the switching valve are directly coupled to each other.

11. The liquid dispensing apparatus according to claim 1, wherein the valve driving mechanism includes a connecting portion that has a concave or convex part formed at an end thereof, and a convex or concave part engageable with the concave or convex part of the connecting portion is provided at an end of the switching valve.

12. A coating apparatus comprising:
the liquid dispensing apparatus according to claim 1;
a compressed gas source that supplies compressed gas to apply pressure to a liquid that is stored in the storage vessel;
a discharge controller that controls driving mechanisms of the liquid dispensing apparatus and gas pressure in the compressed gas source;
a work table on which a coating target is placed;
XYZ driving mechanisms that move the liquid dispensing apparatus and the work table relative to each other; and
a driving controller that controls operations of the XYZ driving mechanisms.

13. The coating apparatus according to claim 12, wherein the coating apparatus is of desktop type.

14. A liquid dispensing method of sucking a liquid into a measuring bore and ejecting the liquid in the measuring bore by moving a piston reciprocally in a liquid dispensing apparatus according to claim 1,
wherein the liquid dispensing method comprises:
a first step of sucking the liquid into the first measuring bore and ejecting the liquid from the second measuring bore by operating the switching valve to the first position and moving the arm in one direction;
a second step of ejecting the liquid from the first measuring bore and sucking the liquid into the second measuring bore by operating the switching valve to the second position and moving the arm in a direction opposite to the moving direction in the first step; and
a third step of successively discharging the liquid in units of a constant amount by repeating the first and second steps.

15. The liquid dispensing apparatus according to claim 1, wherein the first and second pistons are detachably connected to the arm, and extractably inserted in the first and second measuring bores.

16. A liquid dispensing apparatus that sucks a liquid into a measuring bore and ejects the liquid in the measuring bore by moving a piston reciprocally, the liquid dispensing apparatus comprising:
a liquid contact member that has first and second measuring bores;
a first piston sliding in the first measuring bore in close contact therewith and a second piston sliding in the second measuring bore in close contact therewith;
a supply channel communicating with a storage unit;
an ejection channel communicating with a nozzle;
a switching valve that is disposed in an inner space of the liquid contact member, and that has a first position at which the first measuring bore is communicated with the supply channel and the second measuring bore is communicated with the ejection channel, and a second position at which the first measuring bore is communicated with the ejection channel and the second measuring bore is communicated with the supply channel;
a valve driving mechanism that operates the switching valve; and
a piston driving mechanism that operates an arm connected to the first and second pistons,
wherein the first and second measuring bores are arranged to oppose to each other on both sides of the switching valve, and
the supply channel and the ejection channel are arranged adjacent to the switching valve, and
wherein the liquid contact member includes a first bubble mixing prevention mechanism including a first bore that is communicated with the first measuring bore and that allows the piston to move reciprocally in the first bore, and a second bore that is communicated with the first bore at a lateral surface thereof, and a second bubble mixing prevention mechanism including a first bore that is communicated with the second measuring bore and that allows the piston to move reciprocally in the first bore, and a second bore that is communicated with the first bore at a lateral surface thereof.

17. A coating apparatus comprising:
a liquid dispensing apparatus that sucks a liquid into a measuring bore and ejects the liquid in the measuring bore by moving a piston reciprocally;
a compressed gas source that supplies compressed gas to apply pressure to a liquid that is stored in a storage vessel;
a discharge controller that controls the valve and piston driving mechanisms of the liquid dispensing apparatus and gas pressure in the compressed gas source;
a work table on which a coating target is placed;
XYZ driving mechanisms that move the liquid dispensing apparatus and the work table relative to each other; and
a driving controller that controls operations of the XYZ driving mechanisms,
wherein the liquid dispensing apparatus comprising:
a liquid contact member that has first and second measuring bores;
a first piston sliding in the first measuring bore in close contact therewith and a second piston sliding in the second measuring bore in close contact therewith;
a supply channel communicating with a storage unit;
an ejection channel communicating with a nozzle;
a switching valve that is disposed in an inner space of the liquid contact member, and that has a first position at which the first measuring bore is communicated with the supply channel and the second measuring bore is communicated with the ejection channel, and a second position at which the first measuring bore is communicated with the ejection channel and the second measuring bore is communicated with the supply channel;
a valve driving mechanism that operates the switching valve; and
a piston driving mechanism that operates an arm connected to the first and second pistons,
wherein the first and second measuring bores are arranged to oppose to each other on both sides of the switching valve, and
the supply channel and the ejection channel are arranged adjacent to the switching valve, and
wherein the arm holds constant a distance between the first and second pistons.

18. The coating apparatus according to claim 17, wherein the liquid contact member including the switching valve disposed in an inner space thereof is detachably attached to the liquid dispensing apparatus.

19. The coating apparatus according to claim 17, wherein the liquid contact member is constituted as a single member.

* * * * *